US012767271B2

(12) United States Patent
Jones et al.

(10) Patent No.: US 12,767,271 B2
(45) **Date of Patent: *Oct. 20, 2026**

(54) HYBRID PUMP-ACTION VEHICLE AND THERAPY DEVICE

(71) Applicant: Columbia-Inland Corporation, Portland, OR (US)

(72) Inventors: Micheal D. Jones, Portland, OR (US); Jeffrey Michael, Vancouver, WA (US)

( * ) Notice: Subject to any disclaimer, the term of this patent is extended or adjusted under 35 U.S.C. 154(b) by 234 days.

This patent is subject to a terminal disclaimer.

(21) Appl. No.: 18/778,099

(22) Filed: Jul. 19, 2024

(65) Prior Publication Data

US 2024/0391557 A1 Nov. 28, 2024

Related U.S. Application Data

(63) Continuation of application No. 17/482,923, filed on Sep. 23, 2021, now Pat. No. 12,077,245.

(60) Provisional application No. 63/087,994, filed on Oct. 6, 2020.

(51) Int. Cl.

| | |
|---|---|
| ***B62M 6/50*** | (2010.01) |
| ***B60L 15/20*** | (2006.01) |
| ***B62J 45/40*** | (2020.01) |
| ***B62K 5/025*** | (2013.01) |
| ***B62K 5/05*** | (2013.01) |
| ***B62K 5/08*** | (2006.01) |
| ***B62K 15/00*** | (2006.01) |
| ***B62K 21/00*** | (2006.01) |
| ***B62K 21/24*** | (2006.01) |

(Continued)

(52) U.S. Cl.

CPC ............... *B62M 6/50* (2013.01); *B60L 15/20* (2013.01); *B62J 45/40* (2020.02); *B62K 5/025* (2013.01); *B62K 15/00* (2013.01); *B62K 21/00* (2013.01); *B62K 21/24* (2013.01); *B62M 1/12* (2013.01); *B62M 9/06* (2013.01); *B62K 5/05* (2013.01); *B62K 5/08* (2013.01); *B62K 15/006* (2013.01)

(58) Field of Classification Search

CPC ............. B62M 1/12; B62K 21/24; B62K 5/05
See application file for complete search history.

(56) References Cited

U.S. PATENT DOCUMENTS 4,705,284 A * 11/1987 Stout ...................... A61G 5/025 280/282
5,209,506 A * 5/1993 Klopfenstein ........... B62K 5/08 280/243

(Continued)

*Primary Examiner* — Minnah L Seoh
*Assistant Examiner* — Hosam Shabara
(74) *Attorney, Agent, or Firm* — Craig R. Rogers; SIMPLE IP Law, P.C.

(57) ABSTRACT

A hybrid pump-action vehicle and therapy device may include a pumping arm attached to a lower pump-action assembly. As the pumping arm is actuated, the lower pump-action assembly moves forward and rearward in response to the pumping action and powers movement of the vehicle. The lower pump-action assembly may be releasably connected to the pump arm so that the pump arm can be disengaged from the pumping action but still be usable for steering. A motor may also be provided to provide assistance or full power to the vehicle based on a user-selectable amount of assistance. And finally, the vehicle may be configured such that it can be collapsed to a fraction of its operating footprint to enable easy transport and storage.

20 Claims, 32 Drawing Sheets

(51) Int. Cl.
*B62M 1/12* (2006.01)
*B62M 9/06* (2006.01)

(56) References Cited

U.S. PATENT DOCUMENTS

| | | | | |
|---|---|---|---|---|
| 6,378,882 | B1 * | 4/2002 | Devine | B62M 1/12<br>280/287 |
| 7,717,210 | B2 * | 5/2010 | Mahy | B60G 3/20<br>180/209 |
| 7,891,686 | B1 * | 2/2011 | Crawford | B62K 3/005<br>280/282 |
| 9,296,446 | B2 * | 3/2016 | Schminkey | B62M 1/36 |
| 10,710,675 | B2 * | 7/2020 | Park | B62M 19/00 |
| 10,752,317 | B1 * | 8/2020 | Jones | B62M 1/18 |
| 11,447,204 | B2 * | 9/2022 | Jones | B62M 1/28 |
| 2004/0188977 | A1 * | 9/2004 | Jones | B62K 3/005<br>280/282 |
| 2012/0242059 | A1 * | 9/2012 | Wu | B62K 15/00<br>280/287 |
| 2013/0092465 | A1 * | 4/2013 | Moldestad | B62M 6/55<br>280/260 |
| 2018/0072372 | A1 * | 3/2018 | Jones | B62K 5/08 |

* cited by examiner

HYBRID PUMP-ACTION VEHICLE AND THERAPY DEVICE

PRIORITY CLAIM

This application is a continuation of, and claims priority from, U.S. patent application Ser. No. 17/482,923, filed Sep. 23, 2021, which is a non-provisional of and claims priority from U.S. Provisional Patent App. Ser. No. 63/087,994, filed Oct. 6, 2020, the contents of each of which are incorporated herein by reference in its entirety.

BACKGROUND OF THE INVENTION

Field of the Invention

This invention relates generally to vehicles selectively powered by human activity and/or motors. More particularly, this invention relates primarily to a hybrid vehicle that can be human powered, motor powered, or both, and may be especially suited to providing increased mobility and therapy for handicapped individuals.

Related Art

Applicant is the owner of U.S. Pat. Nos. 5,829,772; 6,179,314; 6,932,370; and 10,479,439; as well as U.S. patent application Ser. No. 16/654,369, filed Oct. 16, 2019, the contents of each of which are incorporated herein by reference in their entireties. Pump-Action vehicles have been used as children's toys and as therapy devices for children with disabilities, including learning or developmental disorders. They have also been proposed as transportation devices for adults.

Conventional pump-action vehicles lack a hybrid power system and can further be bulky and difficult to store. What would be desirable is a pump-action vehicle that permits movement based on simple arm and/or leg motions as well as an option for motorized conveyance or assistance. It would also be desirable to provide physical therapy, exercise, and movement to users of the vehicle, including handicapped persons. It would also be beneficial if the pump-action vehicle was able to collapse for easy transport or storage.

SUMMARY OF THE INVENTION

According to various embodiments and principles of the present inventive concepts, a hybrid pump-action and motorized vehicle can be provided that provides therapy and mobility to a user of the device.

In particular, principles of the present inventive concepts provide a pump-action vehicle with a pump arm action and steering mechanics similar to that shown and described in U.S. Pat. No. 10,479,439 and U.S. patent application Ser. No. 16/654,369. A swiveling pump arm can be attached to a frame of the vehicle at a pivot point. The pump arm can be connected to a lower pump-action assembly including a foot plate or pedals. The lower pump-action assembly can be connected to one end of a chain at a connection point, which may be located at or near the back of the lower assembly. The chain can extend along or through a center frame member of a rear frame assembly of the vehicle to a one-directional driving wheel (or clutch) mounted on a driving spindle of the vehicle. The one-directional driving wheel can engage and drive the driving spindle in a driving direction but be free spinning in the opposite direction. The chain can extend around the driving wheel with a second end of the chain being connected to a biasing member such as a spring or other bias force providing member. The biasing member provides a biasing force for pulling the chain back to its starting position.

As the pump arm is pulled rearward or the lower pump-action assembly is pushed forward, the chain is pulled forward, driving the driving wheel and driving spindle. A driving sprocket attached to the driving spindle drives an axle mounted rear wheel through an additional sprocket and chain assembly. The biasing member connected to the opposite end of the pump-action driving chain then pulls the driving chain back to its original position and the pump arm and foot pedals are returned to their initial positions as well.

A steering mechanism can be arranged through the front pump arm. The steering mechanism can include multiple bars and linkages arranged inside the front pump arm and connected to a steering arm through a universal joint located at a center of the pivot point between the pump arm and the frame. The steering arm extends from the universal joint to a steering plate connected to steering bars arranged between two front wheels. As the steering handle is turned, the steering arm rotates, moving the steering plate and turning the front wheels through the connected steering bars.

In addition, however, the principles of the present inventive concepts provide a much more sophisticated vehicle capable of providing independence and mobility to an adult. For instance, in addition to the pump-action arm, a motor can also be provided to either assist a user of the vehicle in providing power to the vehicle or to provide all of the power needed to propel the vehicle. A user-selectable switch (such as a thumb switch on the handle or a switch actuated by rotating the handle) can be provided to enable the user to select how much assistance to receive from the motor. For instance, the user could select between no assistance, minor assistance, moderate assistance, major assistance, or completely motor powered. A sophisticated circuit board and sensor(s) can further or alternatively be provided to determine when and how much assistance to provide to the user. A hybrid vehicle according to principles of the present inventive concepts can be capable of speeds well over 30 mph.

Other features can be provided to enhance the benefits of the hybrid vehicle. For instance, the biasing member can be provided by an elastic band having the desired biasing force. One or more guide wheels can provide guides for preventing unwanted side to side movement of the elastic band. Furthermore, the pump arm connection to the lower pump-action assembly including the foot plate or pedals can be selectively released while retaining the steering connection through the pump arm with the steering assembly. The pump arm may be rotatably or pivotably connected to the lower pump-action assembly at an axis of rotation. One or more spring-loaded catch pins or a catch (or latch) plate can engage with notches arranged in the lower pump-action assembly around the axis to provide a rigid connection between the pump arm and the lower pump-action assembly when engaged. A squeeze lever on the handle of the pump arm, for instance, can be connected through a cable to the spring-loaded catch pins or catch plate arranged on the pump arms. When the squeeze lever is pulled, the pins, latch, or catch plate releases from the notches and the pump arm can freely pivot about the axis independent of the lower pump action assembly.

In this way, the arms can have free and independent movement of the foot pumping action to allow the feet to continue to pump while permitting the arms to rest from the pumping action but continue to steer the vehicle. When the lever is released, the spring(s) bias the pin(s) or catch plate back to the extended position so that when the pump arm is aligned properly with the lower pump-action assembly, the catch pins or plate pops back into place in the notches. In addition to permitting the arms to rest, the releasable pump arm further improves collapsibility to enable a more compact profile for storing the vehicle.

Other features, such as a collapsible front wheel assembly, and a four-bar articulating linkage between the rear frame assembly and the power box and front frame assembly can also provide collapsibility that enables compact storage of the vehicle.

The front wheels, for instance, can be mounted on swiveling swing arms that swing out to an extended position for riding but swing into a collapsed position for storage. A pin can be provided that slides into alignment holes arranged in the front frame assembly and the swing arms to lock the wheels in the extended riding position. With the pin removed, the swing arms and wheels can be folded into a collapsed position near the frame. Biasing springs can also be provided to apply a constant force to the wheel assembly when extended to remove or reduce vibrations that would otherwise result from manufacturing tolerances between parts in the assembly.

A motorized power box can also be provided. In one embodiment, the motor box is arranged along the front frame assembly near the pump arm and steering assembly. The motorized power box can be connected to the driving spindle through a series of chains, gears, and/or sprockets. In one embodiment, an articulating linkage can be provided to enable further collapsibility of the vehicle. For instance, a four-bar articulating linkage can be provided to connect the power box and front frame assembly to the rear frame assembly. During operation of the vehicle, the four bar linkage is locked in an operating position with the motor in the power box available to provide assistance or all of the power needed to propel the vehicle. The motor can, for instance, be connected to a one-directional drive wheel (or clutch) mounted on the driving spindle (or axle) through a series of chains, sprockets, and/or gears arranged along the four-bar linkage and through or along a center frame member of the rear frame assembly.

A dual-latch system can be provided to safely and securely lock the four-bar linkage in its operating position. A first (pre-release) latch acts as a pre-release mechanism to unlock the second latch. The second (primary) latch releases the four-bar linkage from its operating position and permits the rear frame assembly to swing down and forward underneath the power box and the front frame assembly. A cam mechanism can be used to define the path of travel for collapsing the rear frame assembly underneath the front frame assembly and for returning the frame to its extended operational position. In this manner, the length of the vehicle can be substantially reduced to further facilitate easy storage.

The seat can also include hinges or removable connection pins to permit it to be folded or removed to further compact the vehicle for storage. In addition, the seat can include a split seat design having a seat base and two rider support halves connected to the seat base and arranged on opposite sides of the center frame member. The seat base can be pivotably mounted to the center frame member. A rear suspension post can be arranged on the frame at the back of the seat base with a suspension spring arranged on the post that supports the seat base. This can provide a spring biased seat position that can absorb some of the shock associated with vehicle travel and provide a smoother rider experience. The seat back can be pivotably mounted to the seat base with a spring biased position to provide shock absorption to the seat back as well.

In one embodiment, in addition to housing the motor and the control board, the motor box can include a chain, sprocket, and gear assembly that arranges the components in their proper relationship with the four bar articulating linkage. More specifically, a first chain can connect the sprocket on the motor's drive shaft to a free spinning sprocket on a first axle arranged in the power box. A second chain can connect the first axle sprocket to a free spinning sprocket mounted on a second axle arranged in the center frame member. A third chain arranged through the center frame member can connect the second axle sprocket to the one-directional driving wheel (or clutch) on the driving axle (or spindle). A final chain can connect an outside driving sprocket on the driving axle (or spindle) to a sprocket on the rear wheel axle to drive the rear wheel. Additional gears, sprockets, and/or guides can be provided in the power box and along the frame members to provide alignment aids, provide directional and locational guides, to take up chain slack, to drive other components, and/or to simplify assembly.

In one embodiment, both the chain connecting the lower pump-action assembly to the drive spindle and the chain connecting the motor to the drive spindle are arranged through the center frame member of the rear frame assembly. The two one-directional drive wheels (or clutches) can be configured into a single clutch unit that drives the drive spindle within the center frame member. The elastic biasing member of the pump chain can also be arranged within the center frame member.

In addition to the arm release squeeze lever, a squeeze lever arranged on the other handle can connect to a disc brake arranged in communication with the driving wheel to provide braking to the vehicle. When the braking lever is squeezed, the disc brake activates to slow and stop the vehicle.

In one embodiment, an electric motor is used to provide power to the vehicle. To power the electric motor, a removable, rechargeable battery is preferably provided, such as along the front frame assembly. In an embodiment, the battery comprises a battery pack having a plurality of rechargeable cells arranged in a battery housing. The battery housing can be designed in two halves that are connected together and fit around the front frame assembly. A latch can be provided that selectively releases the battery from its connection to the frame and permits it to be easily removed for replacement.

The battery powered motor and associated battery may assist in providing a driving force to the vehicle. As explained above, the motor may be connected to the driving axle or spindle through one or more belts, chains, sprockets, gears, or other connection mechanisms. In one embodiment, the operator is given the option of selecting how much assistance to receive from the motor. The selection may range anywhere from no assistance to maximum assistance. One or more sensors may also or alternatively be provided that detect when the operator is having difficulty powering the vehicle and send a signal to the control board. The control board can monitor the sensor output and activate the motor assist in response. In one embodiment, one or more sensors can be provided that sense resistance or difficulty as an operator attempts to operate the pump arms and propel the vehicle. If a large amount of resistance or difficulty is detected (such as on an incline or for users with less arm mobility or strength), the sensors can detect this and engage the motor at an appropriate level.

A user selectable switch or other user selectable control could be provided to enable the user to select how much assistance they would like from the motor. A user could, for example, choose to operate the vehicle completely manually, or the user could select up to a maximum amount of assistance from the motor. Preferably, the switch or other user selectable control permits a wide range of options between the minimum and maximum assistance. The switch could, for instance, be a thumb switch or dial arranged on a handle or could be activated by rotating the handle itself. Of course, any other type of dial, switch, button, or remote control could also be used for this purpose.

Various aspects, embodiments, and configurations of the inventive concepts are possible without departing from the principles disclosed herein. For instance, sprockets and chains can be replaced with pulleys and belts without departing from the inventive concepts herein. The term sprocket as used herein is therefore intended to include pulleys and other similar components and the term chain should be construed to cover belts, ropes, and other such components. The inventive concepts are therefore not limited to any of the particular aspects, embodiments, or configurations shown or described herein.

BRIEF DESCRIPTION OF DRAWINGS

The foregoing and additional objects, features, and advantages of the present inventive concepts will become more readily apparent from the following detailed description, made with reference to the attached figures, in which.

DETAILED DESCRIPTION OF ILLUSTRATIVE EMBODIMENTS

Various features, benefits, and configurations incorporating principles of the present inventive concepts in illustrative embodiments are shown in the accompanying drawings. Additional features, benefits and configurations will be readily apparent to those of ordinary skill in the art based on this disclosure, and all such features, benefits and configurations are considered within the scope of the present invention. Various features will now be described in greater detail in connection with embodiments of the present inventive concepts, as illustrated in the accompanying drawings.

Figure 1:
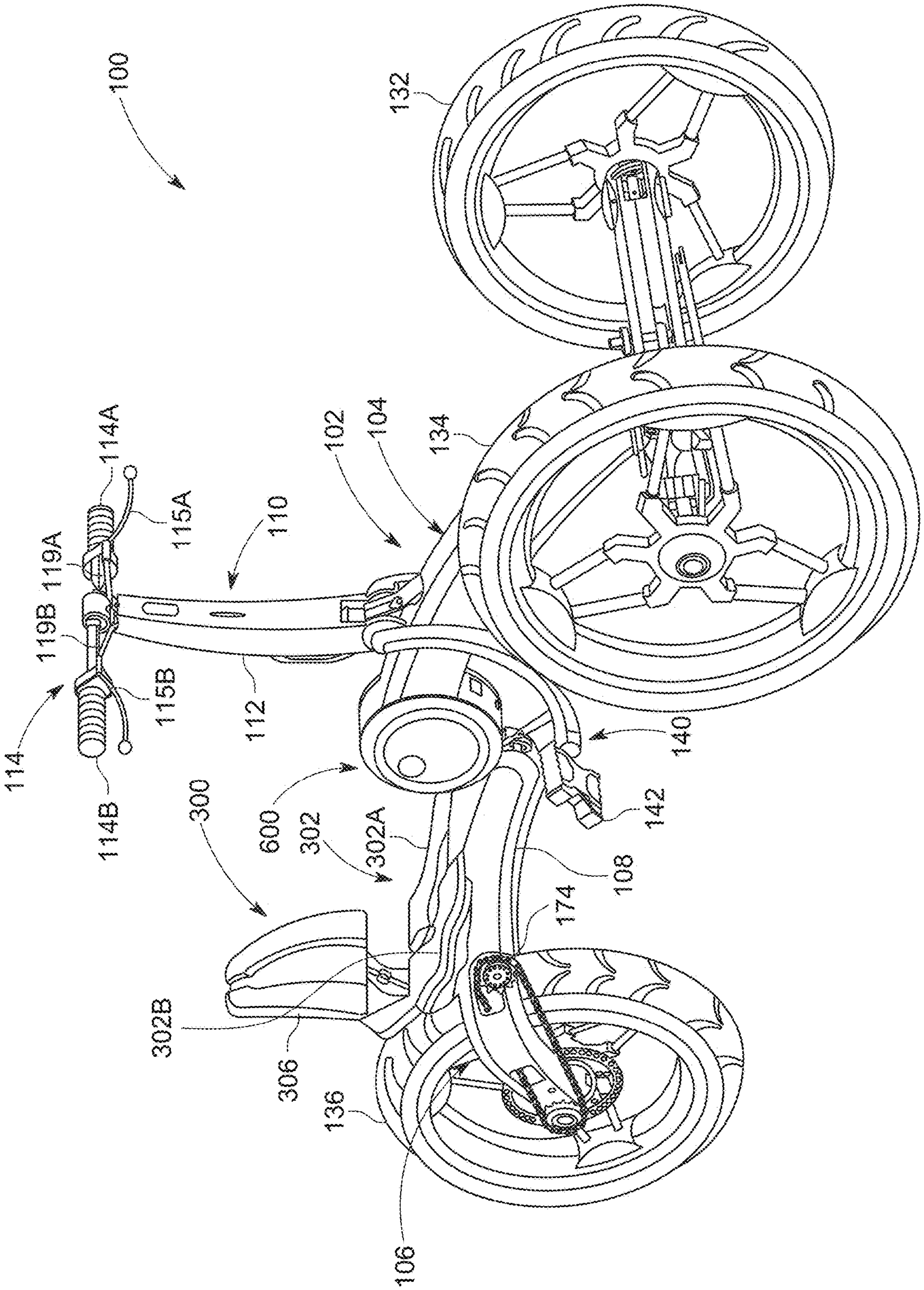
FIGS. 1-1C are somewhat schematic perspective views of a hybrid vehicle in an operating configuration according to principles of the present inventive concepts.
Figure 1A:
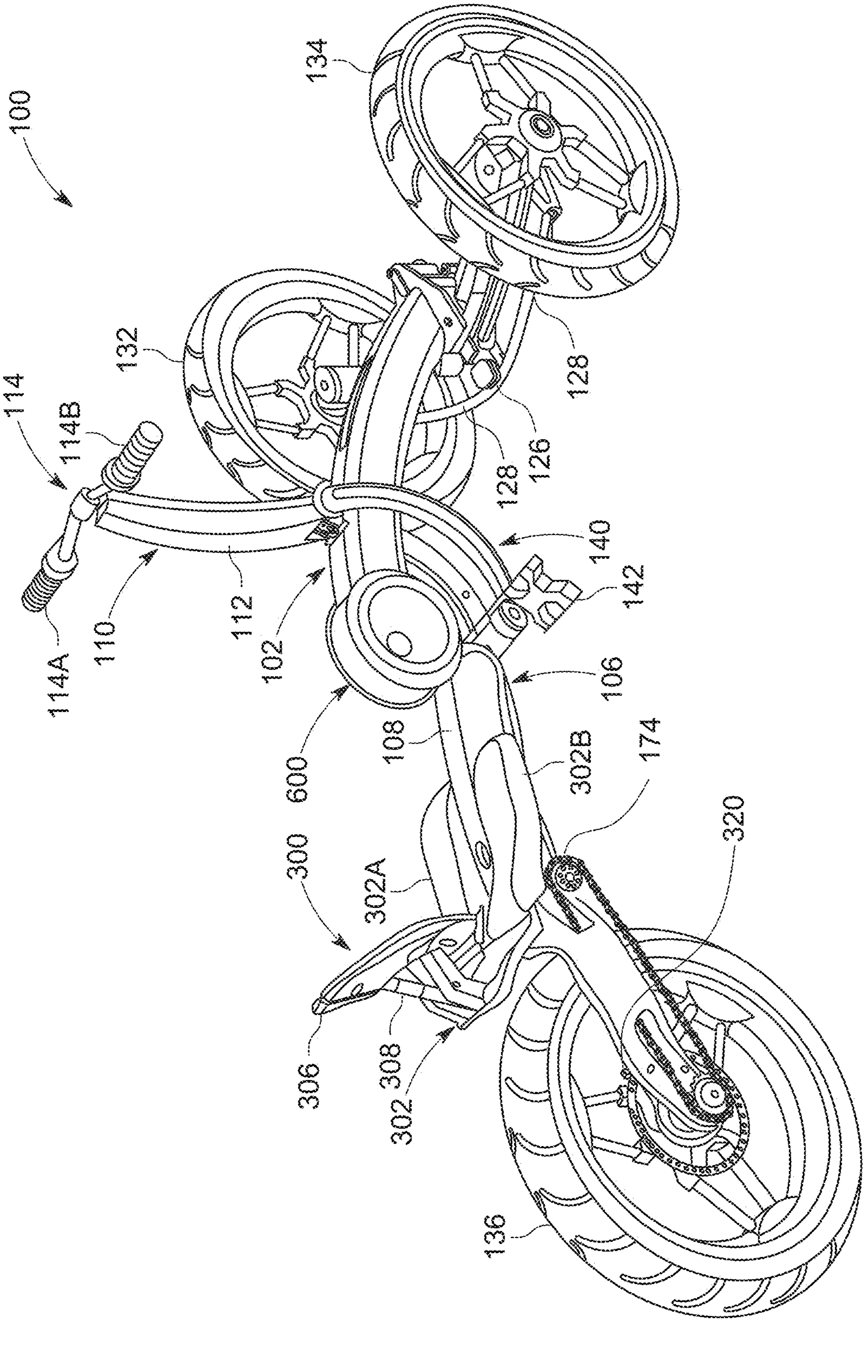
FIG. 1D is a somewhat schematic top view of the hybrid vehicle of FIG. 1.
FIG. 1E is a somewhat schematic front view of the hybrid vehicle of FIG. 1.
Figure 1B:
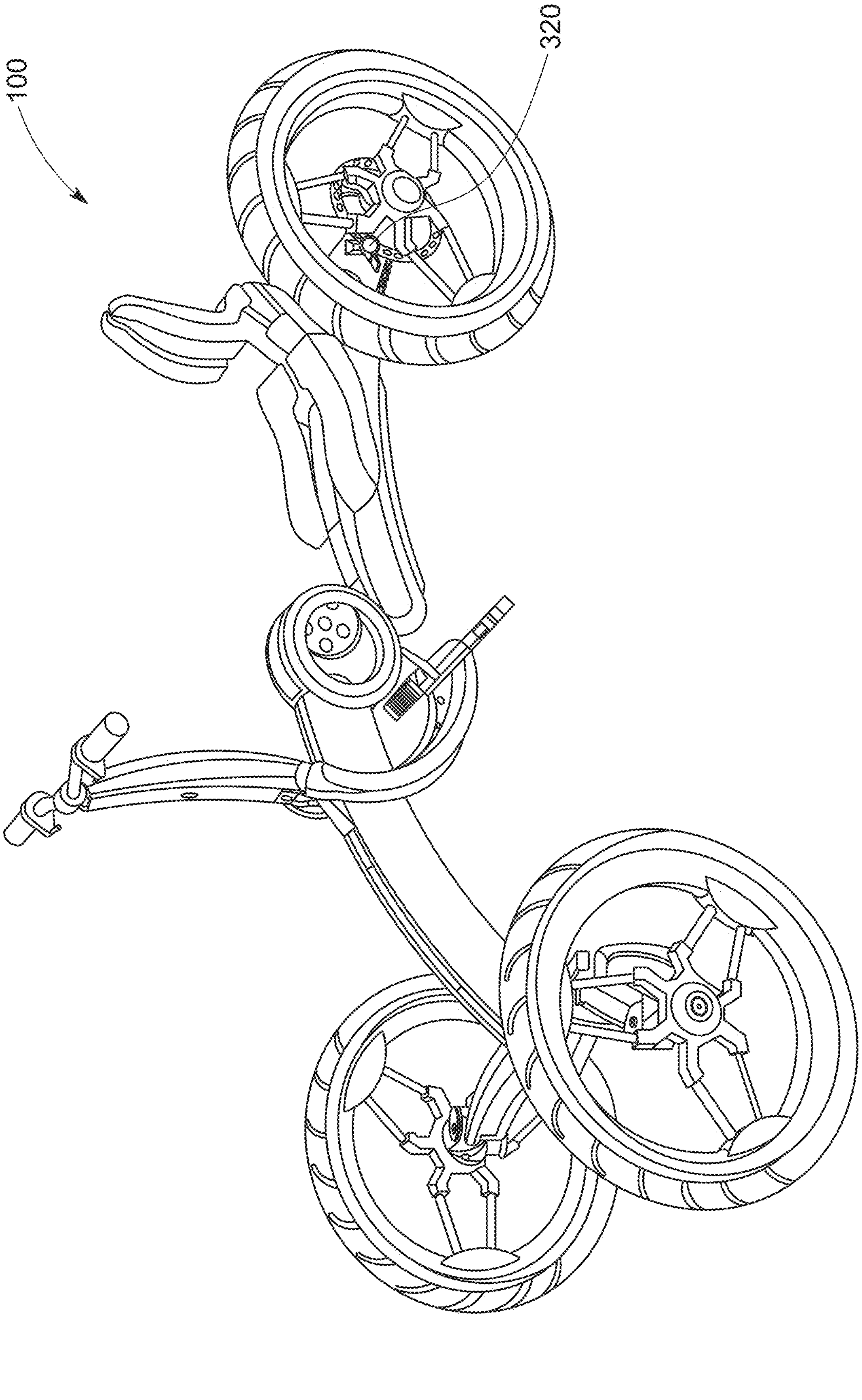
Figure 1C:
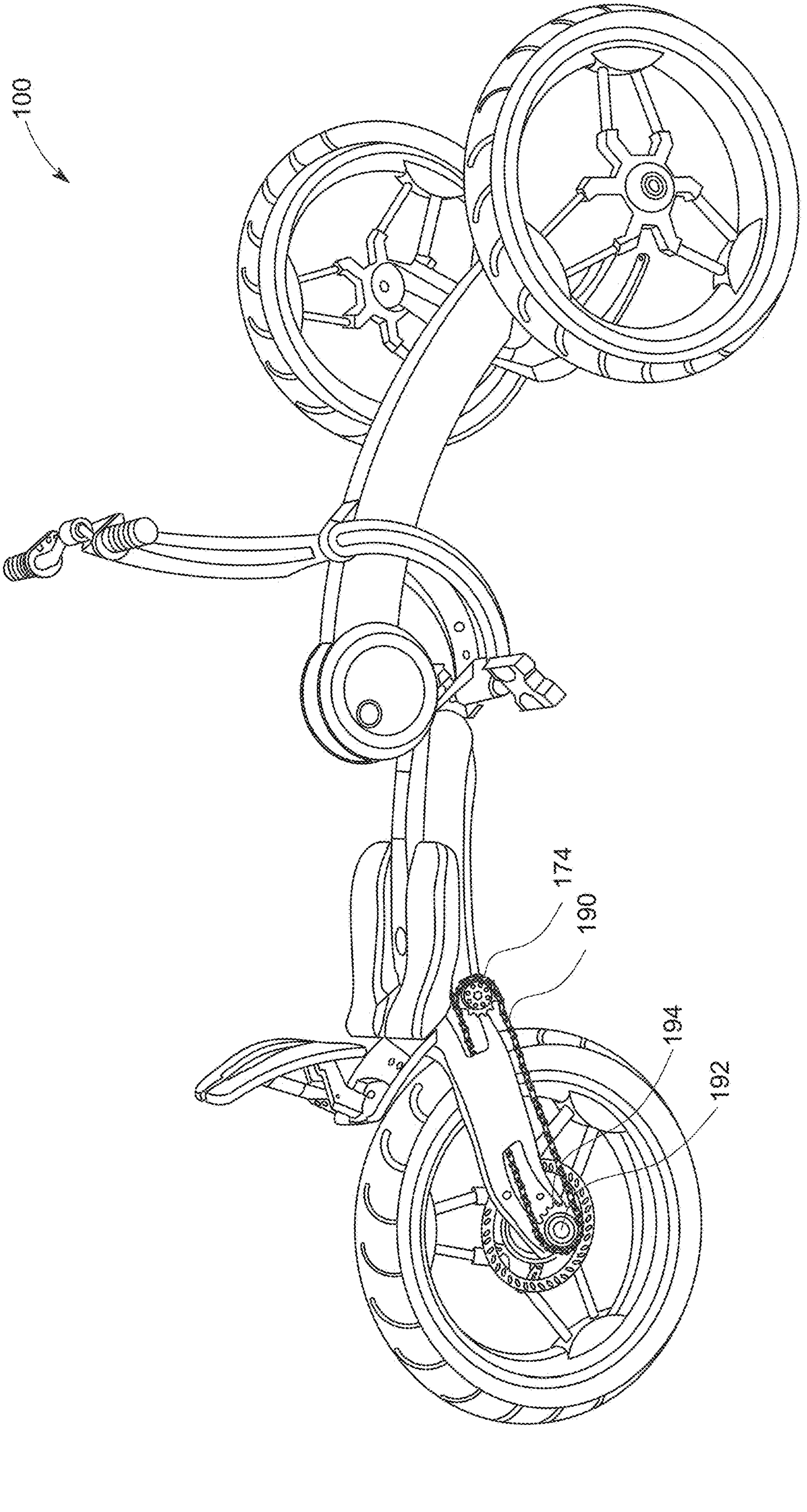
Figure 1D:
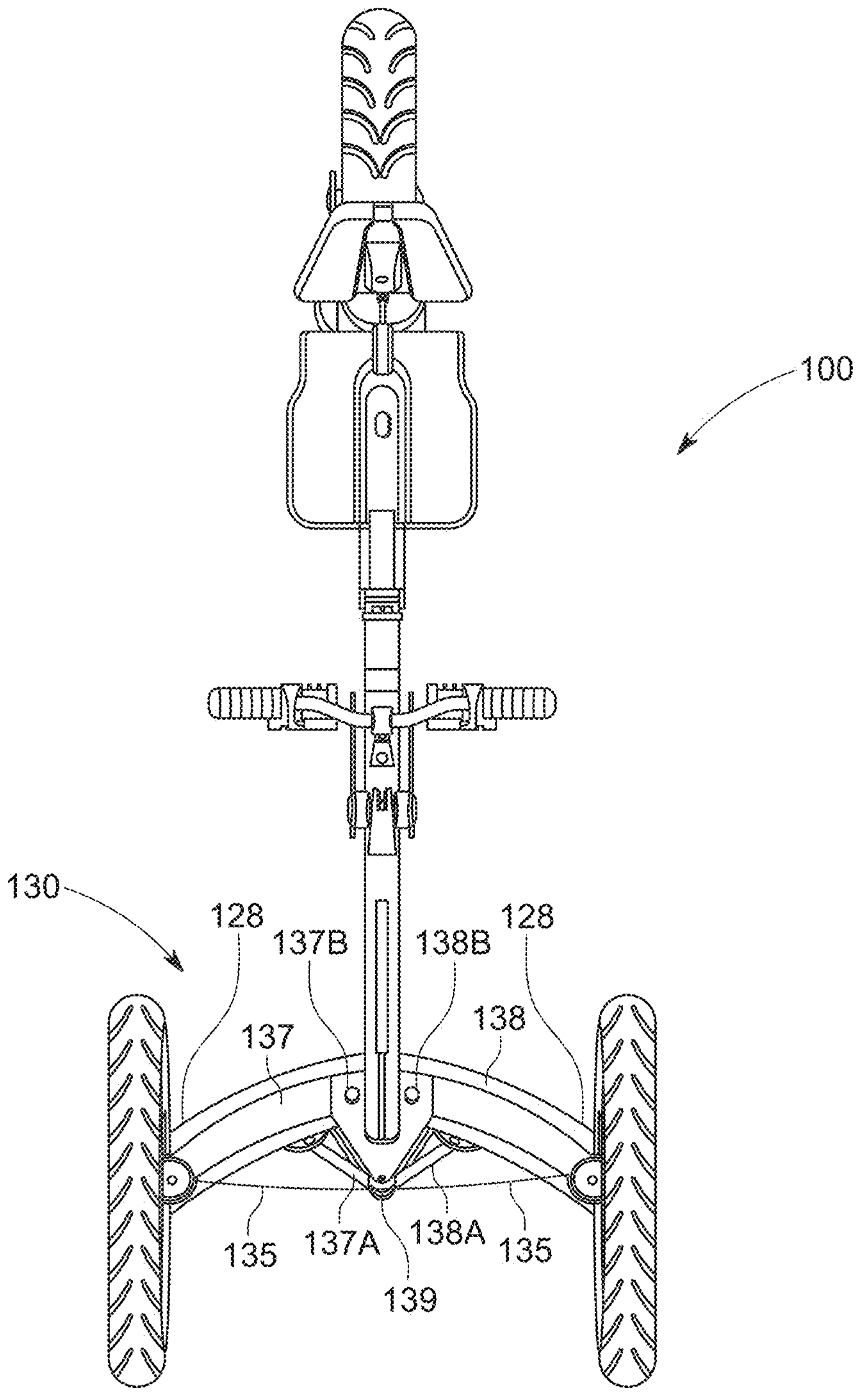
Figure 1E:
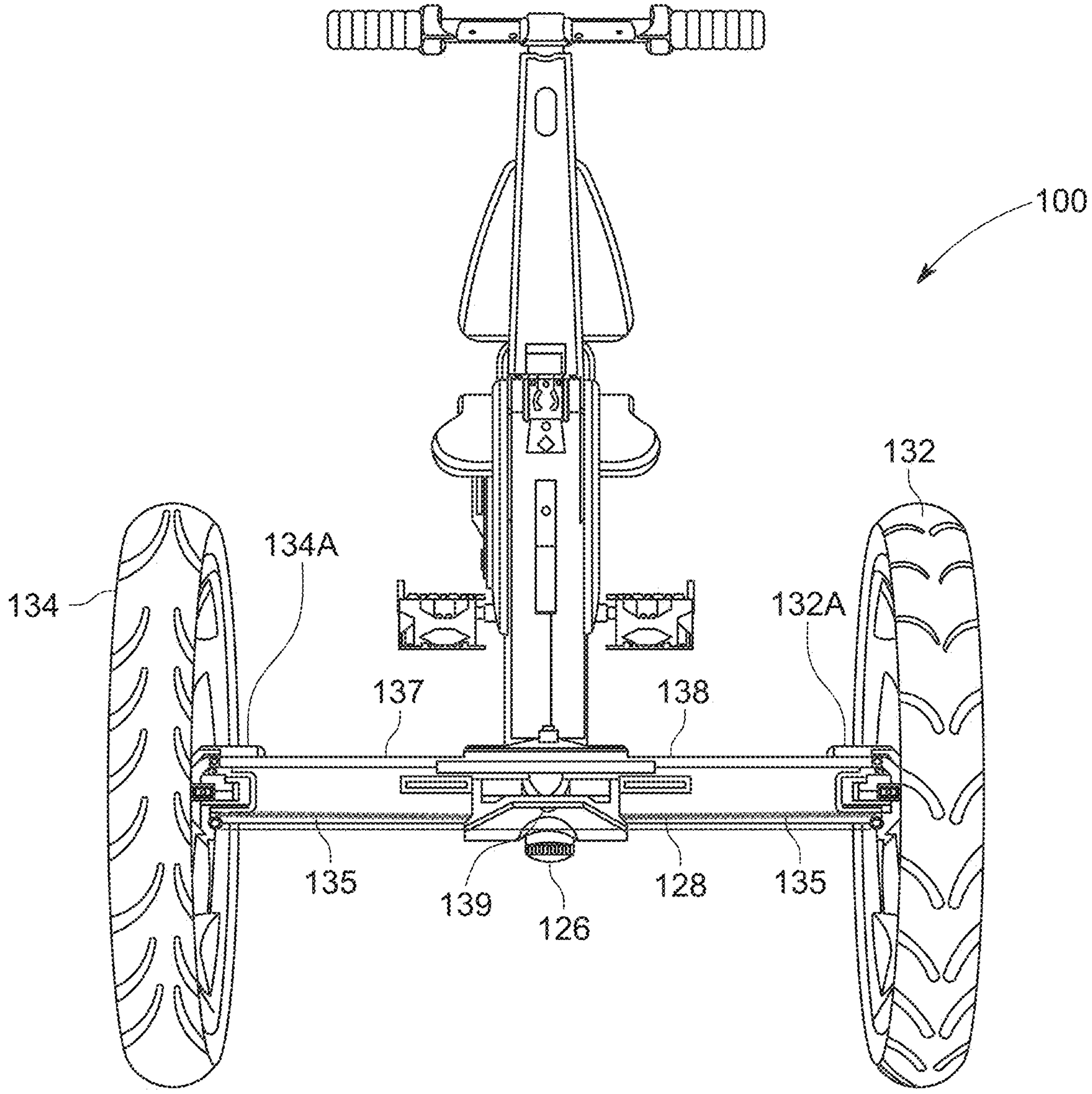

Referring first to FIGS. 1-1E, in one embodiment, a hybrid vehicle 100 is provided which permits an operator to operate the vehicle 100 through a pump-action generated using either their arms or legs, or using both. The vehicle 100 may additionally, or alternatively, provide therapeutic leg and arm movement to the operator while operating using a motor 250, such as a battery-powered motor 250. The battery-powered motor 250 may be configured to selectively provide all, a portion, or none of the driving force needed to operate the vehicle 100. In other words, the motor 250 may selectively provide the driving force for the vehicle 100, assist in providing the driving force for the vehicle 100, or be disabled from providing any assistance, dependent upon the needs or desires of the operator.

Figure 4:
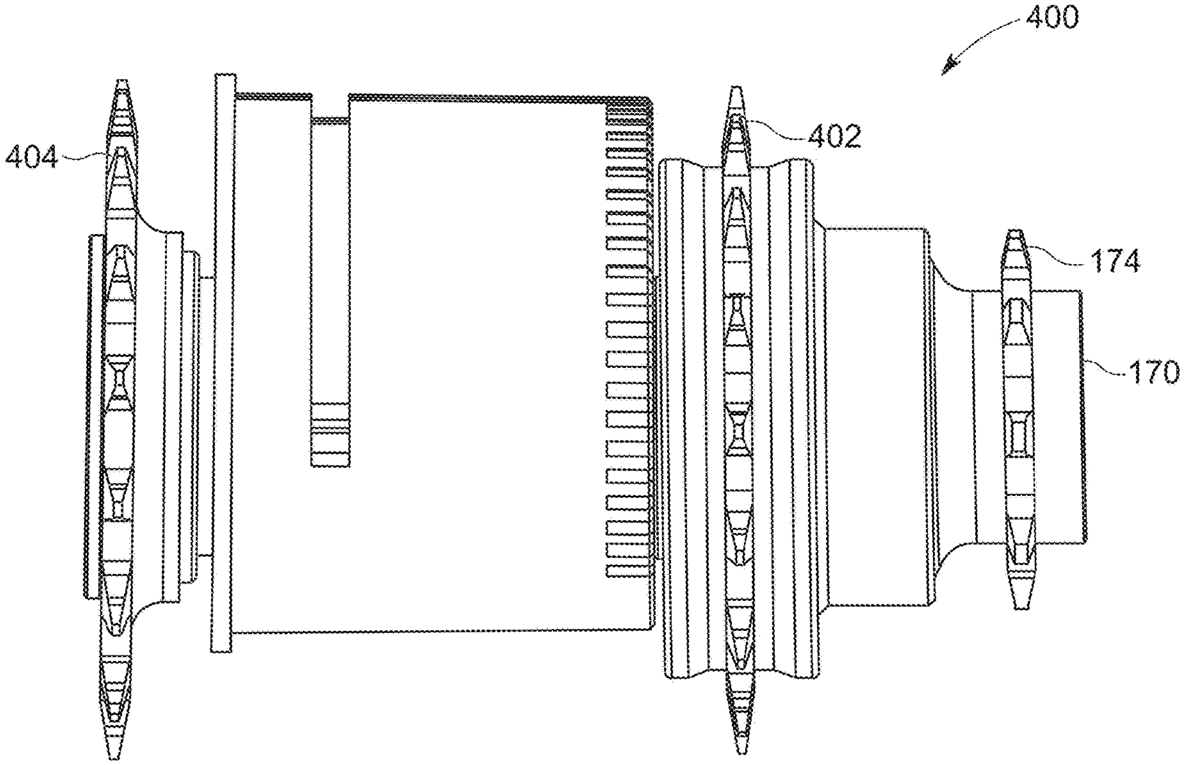
FIG. 4 is a somewhat schematic illustration of a one-directional driving clutch for the hybrid vehicle of FIG. 1, according to one embodiment of the present inventive concepts.
Figure 4A:
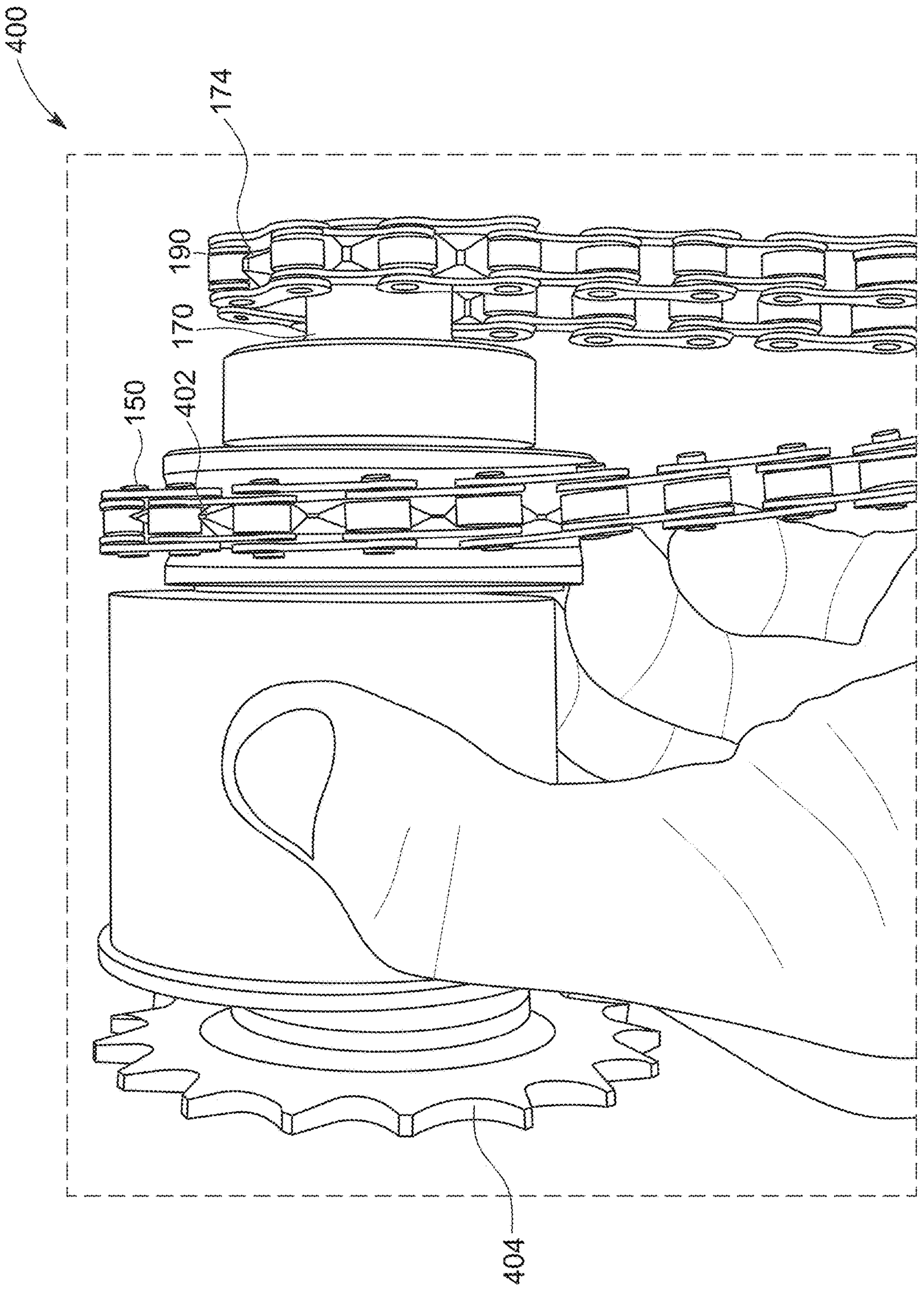
FIG. 4A is a somewhat schematic illustration of a prototype drive clutch for the hybrid vehicle of FIG. 1.

A pump arm assembly 110 may be provided which can propel the hybrid vehicle 100 forward through a simple pumping action. For instance, a swiveling pump arm 112 can be attached to a frame 102 of the vehicle 100 at a pivot point 112A. The pump arm 112 can be further connected to a lower pump-action assembly 140 including a foot plate (not shown) or pedals 142. The lower pump-action assembly 140 can be connected to one end 152 of a chain 150 at a connection point 152A, which may be arranged at or near a rear portion of the lower assembly 140. The chain 150 can extend along or through a center frame member 108 of a rear frame assembly 106 of the vehicle 100 to a first sprocket 402 of a one-directional driving wheel (or clutch) assembly 400 (see FIG. 4) which drives a driving spindle 170 of the vehicle 100. The one-directional clutch assembly 400 can engage and drive the driving spindle 170 in a driving direction but be free spinning in the opposite direction (see FIGS. 4 and 4A). The chain 150 can extend around the first driving wheel sprocket 402 with a second end 154 of the chain being connected to a biasing member 180 such as a spring or other bias force providing member. Rather than a spring, the biasing member 180 can be an elastic band having the desired biasing force. One or more guide wheels or pulleys 182A can provide guides for preventing unwanted side to side movement of the elastic band 180 and/or chain 150. The biasing member 180 provides a biasing force for pulling the chain 150 back to its starting position.

As the pump arm 112 is pulled rearward using the handle 114, or as the foot pedals 142 are pushed forward, the lower pump-action assembly 140 is driven forward, pulling the chain 150 and thereby driving the driving wheel 400 and driving spindle 170. A driving sprocket 174 attached to the driving spindle 170 drives a rear wheel 136 mounted on a rear axle 192 through an additional sprocket 194 mounted to the rear axle 192 and a chain 190 connected between the rear axle sprocket 194 and the driving sprocket 174. The biasing member 180, connected to the opposite end 154 of the pump-action driving chain 150, then pulls the chain 150 back to its original position and the pump arm 112 and foot pedals 142 are returned to their initial positions as well.

Figure 3:
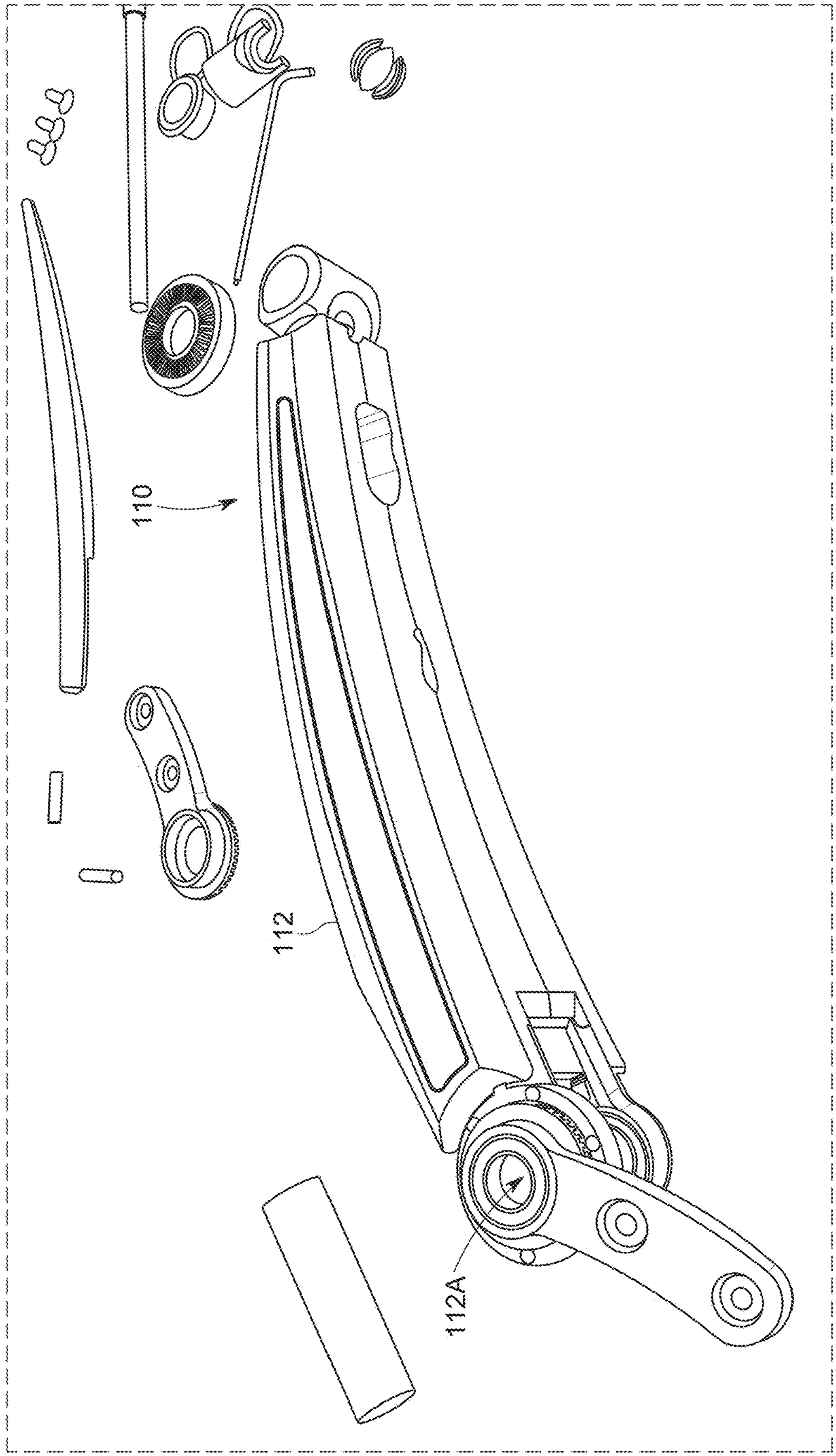
FIG. 3 is a somewhat schematic illustration showing the pump arm of the hybrid vehicle of FIG. 1.
Figure 3A:
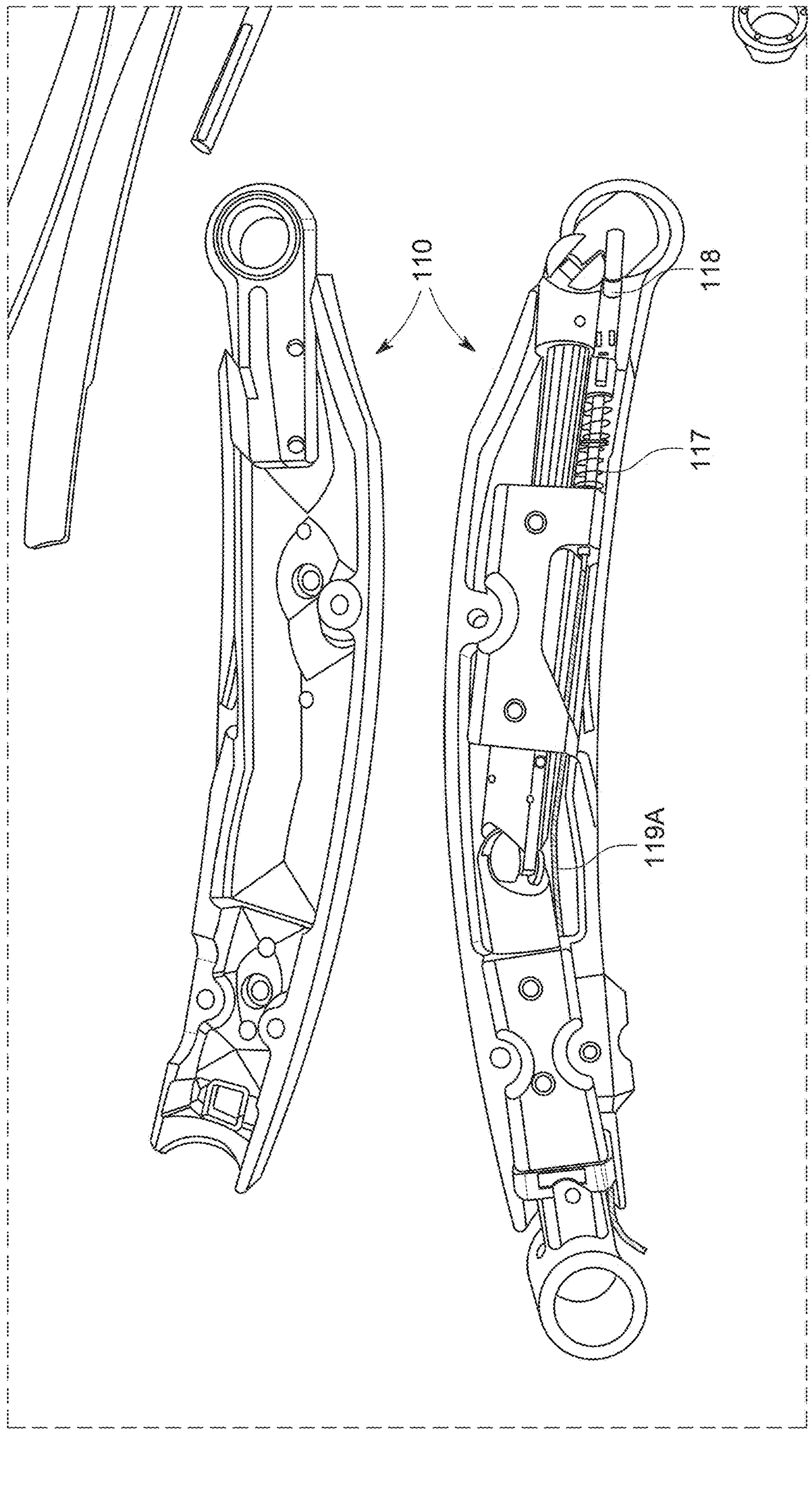
FIG. 3A is a somewhat schematic illustration showing the disassembled pump arm of the hybrid vehicle of FIG. 1.
Figure 3B:
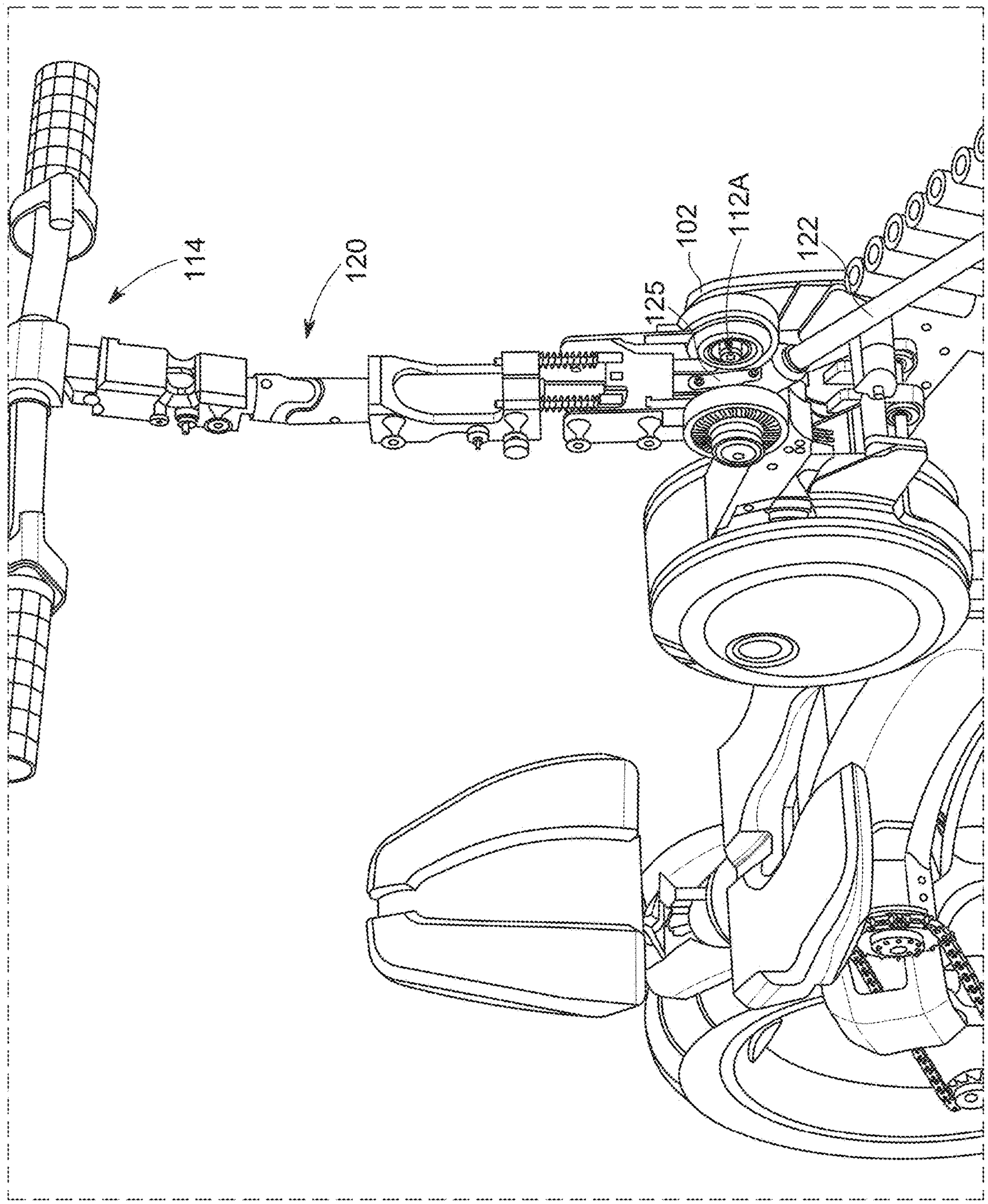
FIG. 3B is a somewhat schematic perspective view showing the internal steering mechanism arranged through the pump arm of the hybrid vehicle of FIG. 1, according to additional principles of the present inventive concepts.
Figure 3C:
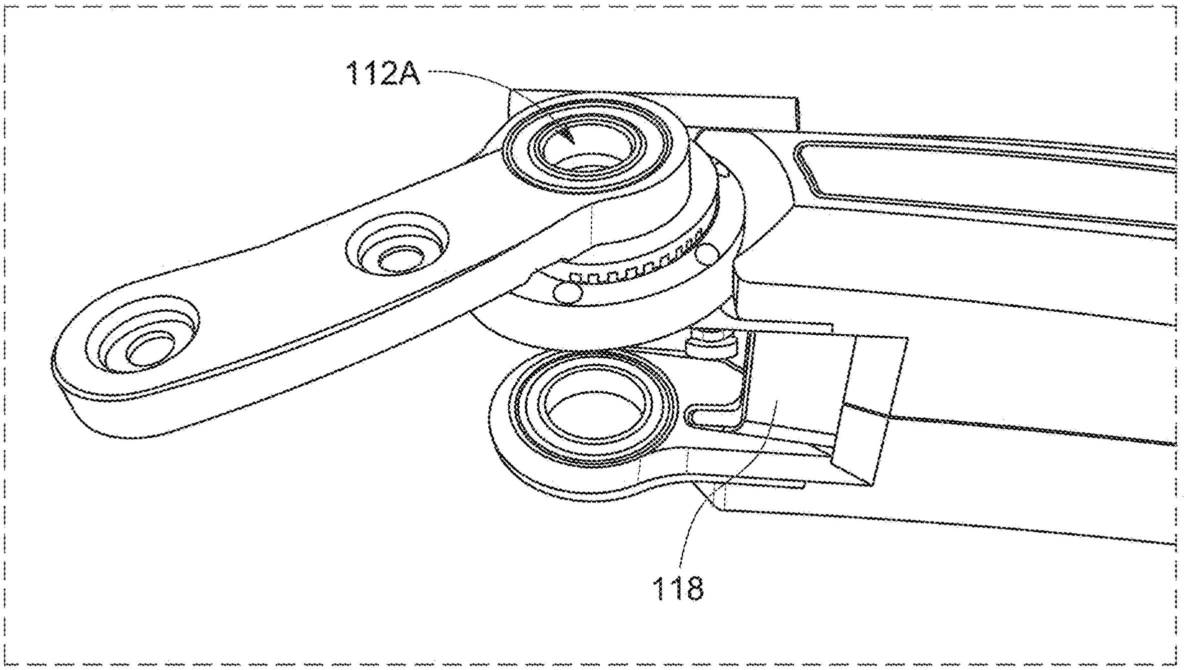
FIG. 3C is a somewhat schematic illustration showing the pump arm of FIG. 3 with the spring loaded latching plate latched in an indexing or latched position to move the lower pump-action assembly along with movement of the pump arm.
Figure 3D:
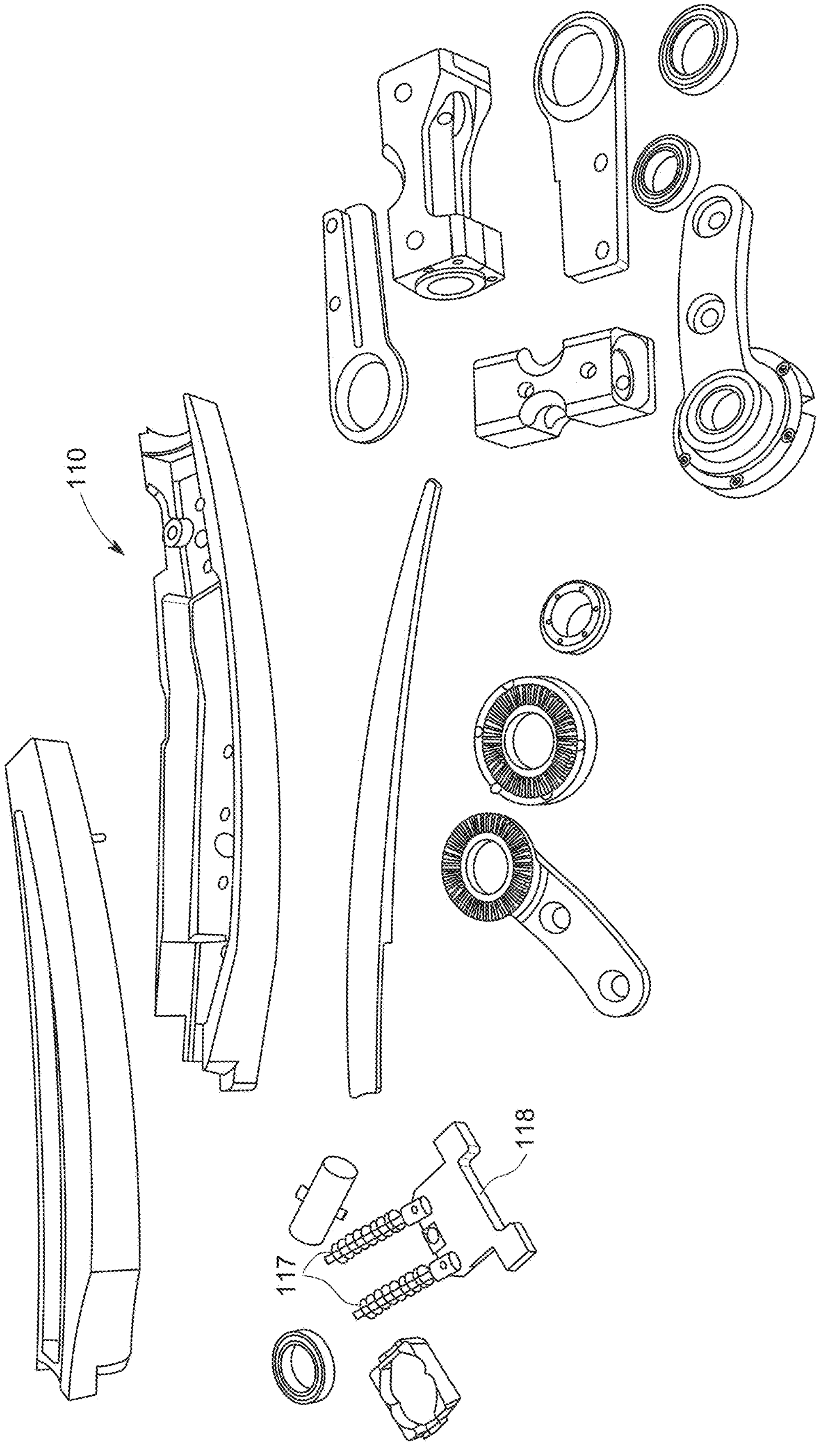
FIG. 3D is a somewhat schematic illustration showing disassembled components of the pump arm assembly of the hybrid vehicle of FIG. 1.

Referring now additionally to FIGS. 3-3D, in one embodiment, the pump arm 112 connection to the lower pump-action assembly 140 including the foot plate or pedals 142 can be selectively released while retaining the connection between the pump arm 112 and the steering assembly 120. More particularly, the pump arm 112 may be rotatably or pivotably connected to the frame 102 at an axis of rotation 116. The pump arm 112 may further be releasably connected to the lower pump action assembly 140 at the axis 116. One or more spring-loaded catch pins (not shown) or a catch (or latch) plate 118 can engage with notches 144 arranged in the lower pump-action assembly 140 around the axis 116 to provide a rigid connection between the pump arm 112 and the lower pump-action assembly 140 when engaged. A squeeze lever 115A on the first handle 114A of the pump arm 112, for instance, can be connected through a cable 119A to the spring-loaded catch pins or catch plate 118 arranged on the pump arm 112. When the squeeze lever 115A is pulled, the pins or plate 118 releases from the notche(s) 144 and the pump arm 112 can freely pivot about the axis 116. The steering mechanism 120, however, remains connected.

In this way, the arms 112 can have movement that is free and independent of the foot pumping action to allow the feet to continue to pump while permitting the arms to rest from the pumping action but continue to steer the vehicle 100. When the lever 115A is released, the spring(s) 117 bias the pin(s) or catch plate 118 back to the extended position so that when the pump arm 112 is aligned properly with the lower pump-action assembly 140, the catch pins or plate 118 pops back into place in the notches 144. In addition to permitting the arms to rest, the releasable pump arm 112 further provides collapsibility to enable a more compact profile for storing the vehicle 100.

The steering mechanism 120 can be arranged through the front pump arm 112 with multiple bars and linkages arranged inside the front pump arm 112 and connected to a steering arm 122 through a universal joint 125 located at a center of the pivot point 112A between the pump arm 112 and the frame 102. The steering arm 122 extends from the universal joint 125 to a steering plate 126 connected to steering bars 128 arranged between the two front wheels 132, 134. As the handle 114 is turned, the steering arm 122 rotates, moving the steering plate 126 and turning the front wheels 132, 134 through the connected steering bars 128.

In addition to the pump-action arm 112, a motor 250 can be provided to either assist a user of the vehicle 100 in providing power to the vehicle 100 or to provide all of the power needed to propel the vehicle 100. A user-selectable switch (such as a thumb switch on the handle or a switch activated by a rotatable handle) (not shown) can be provided to enable the user to select how much assistance to receive from the motor 250. For instance, the user could select between no assistance, minor assistance, moderate assistance, major assistance, or completely motor powered. A sophisticated circuit board and sensor(s) (not shown) arranged, for instance, in the motor box 600 can also or alternatively be provided to determine when and how much assistance to provide to the user. A hybrid vehicle 100 according to principles of the present inventive concepts can be capable of speeds well over 30 mph.

Figure 5:
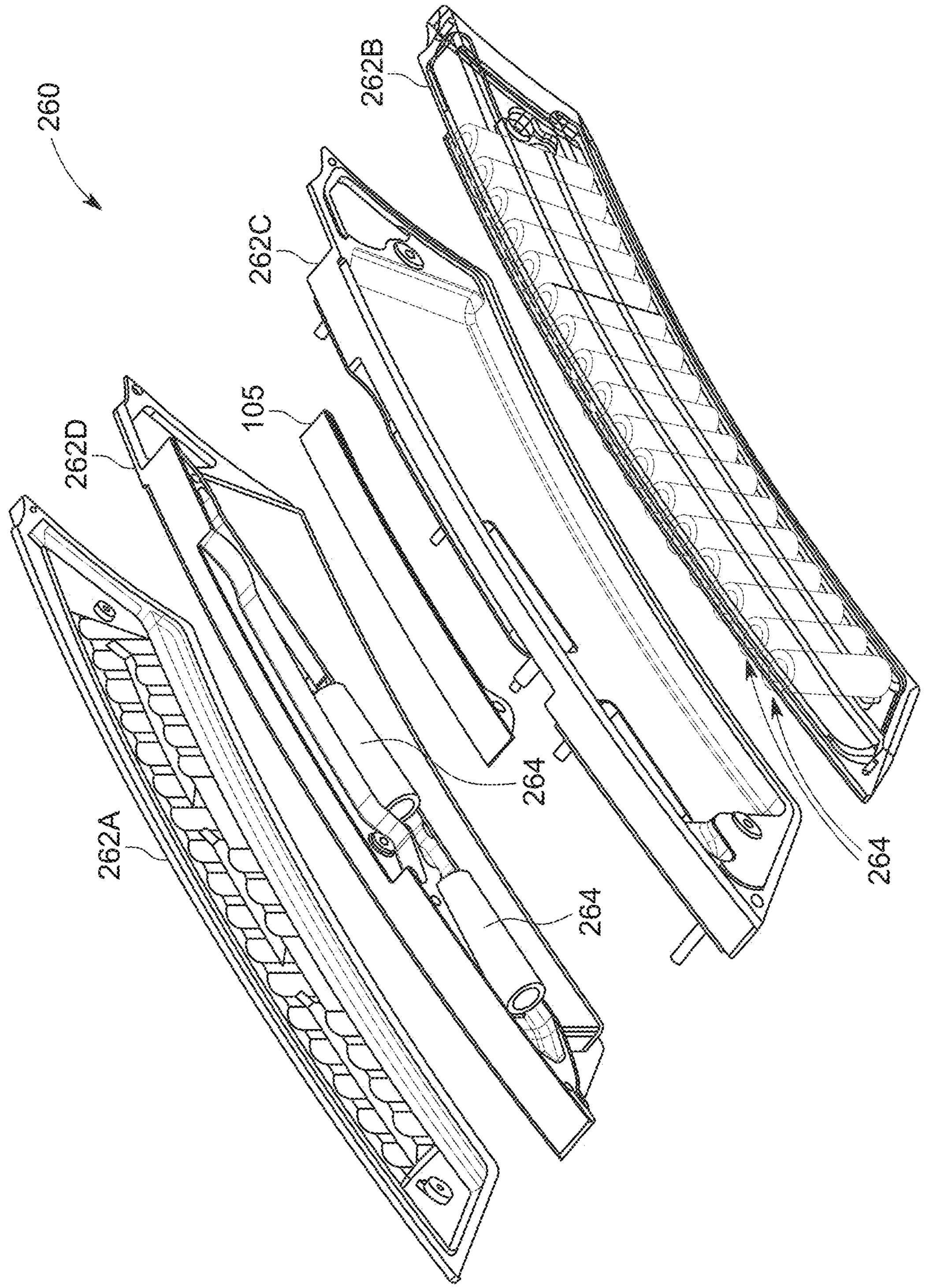
FIGS. 5-5C are various somewhat schematic illustrations of a removable, rechargeable battery system for the hybrid vehicle of FIG. 1.
Figure 5A:
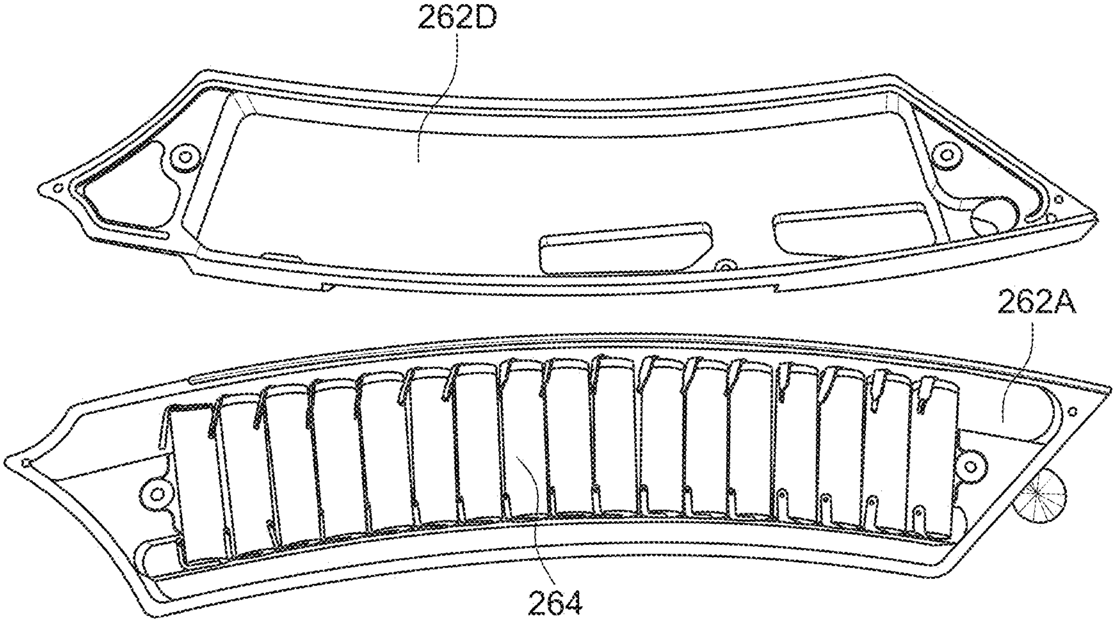
Figure 5B:
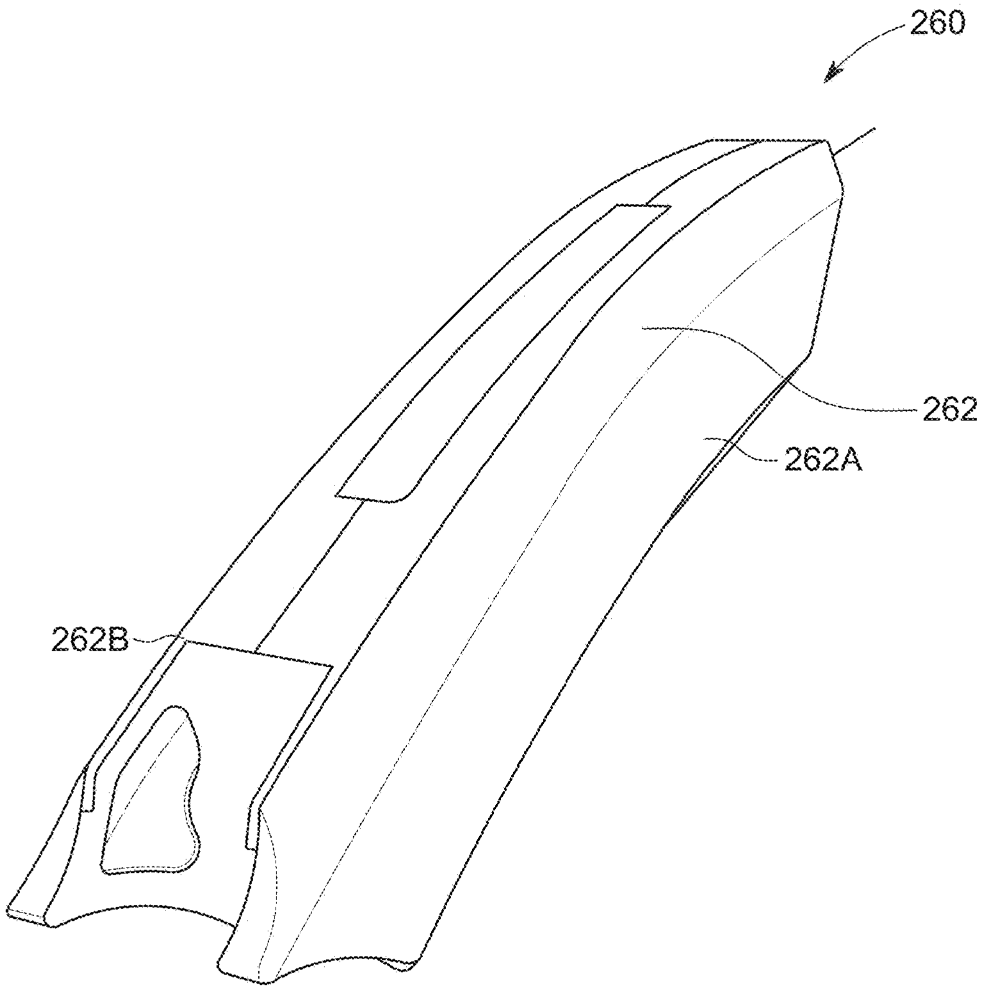
Figure 5C:
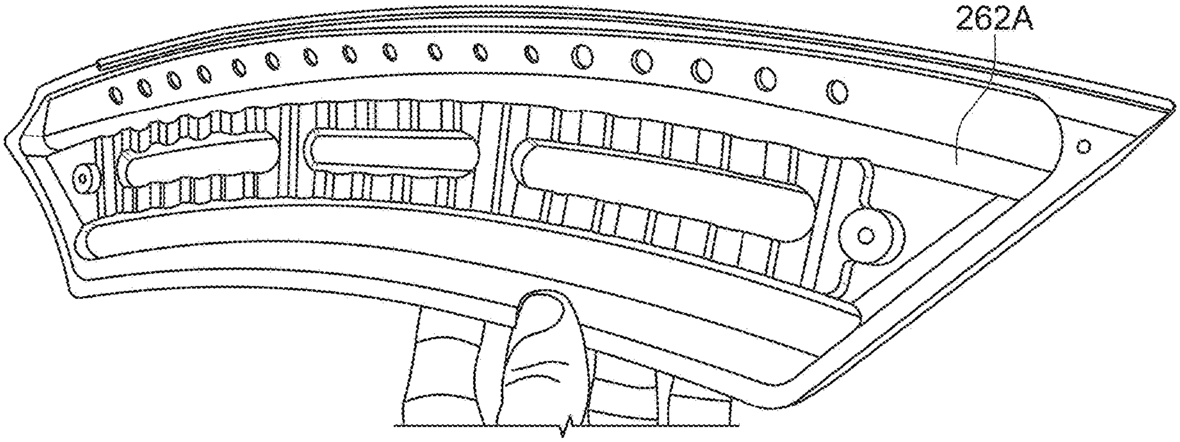

In the embodiment shown in FIG. 1, an electric motor 250 can be used to provide power to the vehicle 100. Referring additionally to FIGS. 5-5C, a removable, rechargeable battery or battery pack 260 is preferably provided along the front frame assembly 104 to provide power to the electric motor 250. In this embodiment, the battery 260 comprises a plurality of rechargeable cells 264 arranged in a battery housing 262. The battery housing 262 can be designed in two halves 262A, 262B with internal members 262C, 262D that are connected together and fit around the front frame assembly 104. A latch 105 can be provided that selectively releases the battery 260 from its connection to the frame 102 and permits it to be easily removed for replacement.

The battery powered motor 250 and associated battery 260 may assist in providing a driving force to the vehicle 100. As explained above, the motor 250 may be connected to the driving axle or spindle 170 through one or more sprockets, pulleys, gears, belts, chains, or other connection mechanisms. In one embodiment, the operator is given the option of selecting how much assistance to receive from the motor 250. The selection may range anywhere from no assistance to maximum assistance. One or more sensors (not shown) may also or alternatively be provided that detect when the operator is having difficulty powering the vehicle and sends a signal to the control board (not shown). The control board can monitor the sensor output and activate the motor assist in response. In one embodiment, one or more sensors can be provided that sense resistance or difficulty as an operator attempts to operate the pump arms 112 and propel the vehicle 100. If a large amount of resistance or difficulty is detected (such as on an incline or for users with less arm mobility or strength), the sensors can detect this and engage the motor 250 at an appropriate level.

A user selectable switch or other user selectable control (not shown) could be provided to enable the user to select how much assistance they would like from the motor 250. A user could, for example, choose to operate the vehicle completely manually, or the user could select up to a maximum amount of assistance from the motor 250. Preferably, the switch or other user selectable control permits a wide range of options between the minimum and maximum assistance. The switch could, for instance, be a thumb switch or dial arranged on the handle 114 or activated by rotating one of the handles 114A, 114B. Of course, any other type of dial, switch, button, or remote control could also be used.

Figure 6:
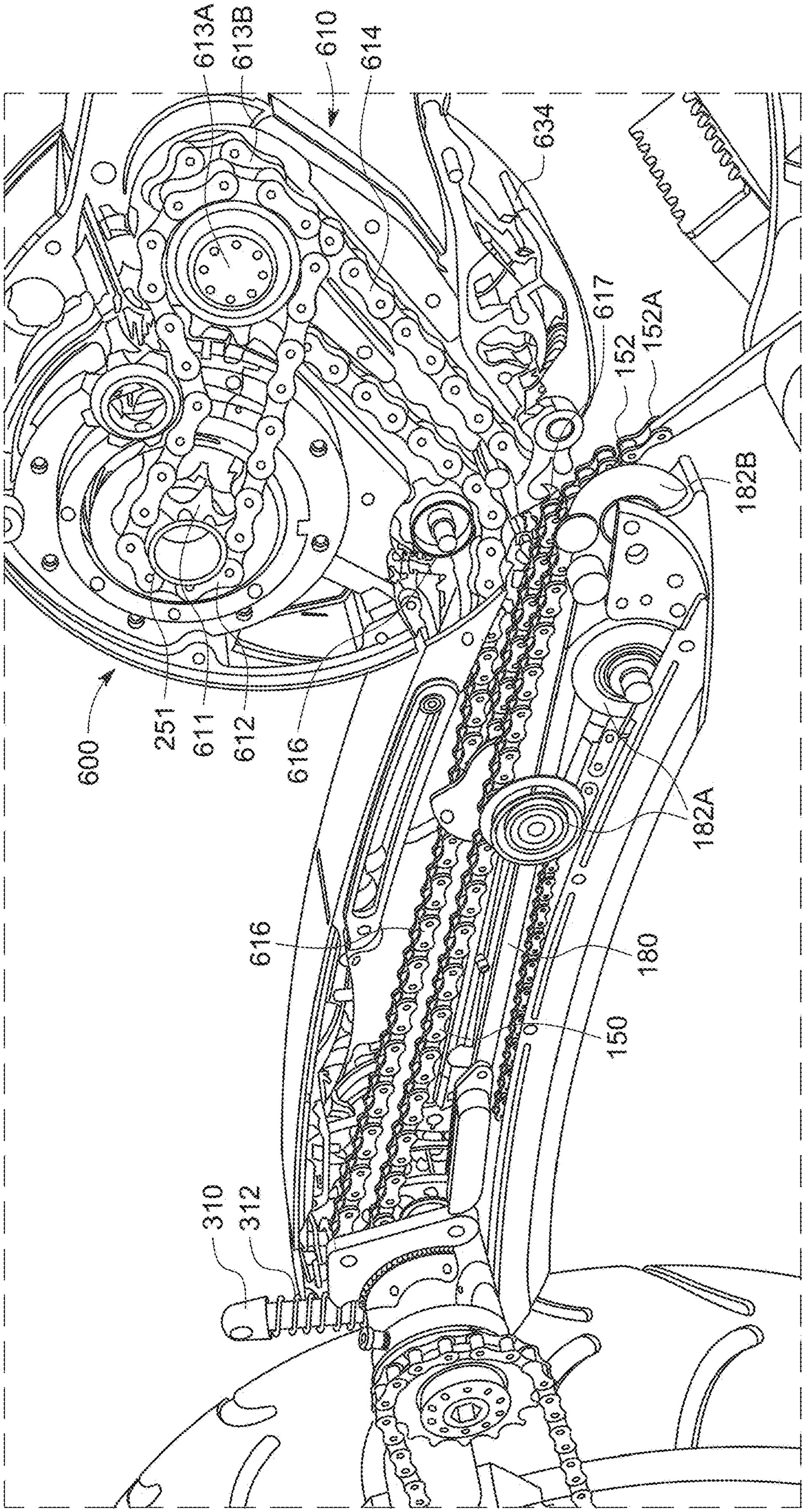
FIG. 6 is a somewhat schematic illustration of the internal arrangement of components in the motor box and center frame member of the hybrid vehicle of FIG. 1 providing a drive train for delivering power from the pump-action assembly and motor to the vehicle.
Figure 6A:
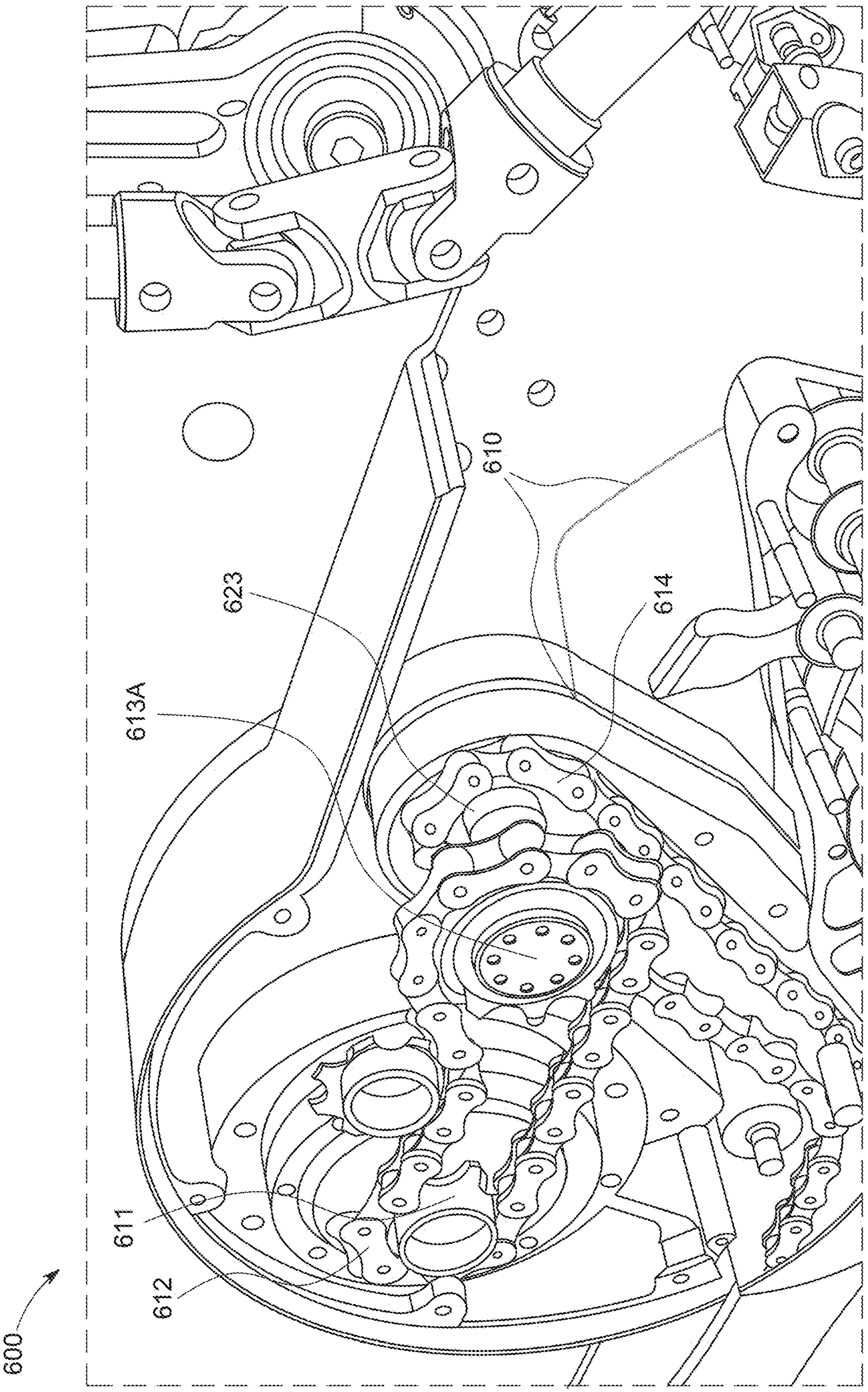
FIG. 6A is a somewhat schematic close-up view of the internal components of the motor box of FIG. 6.
Figure 6B:
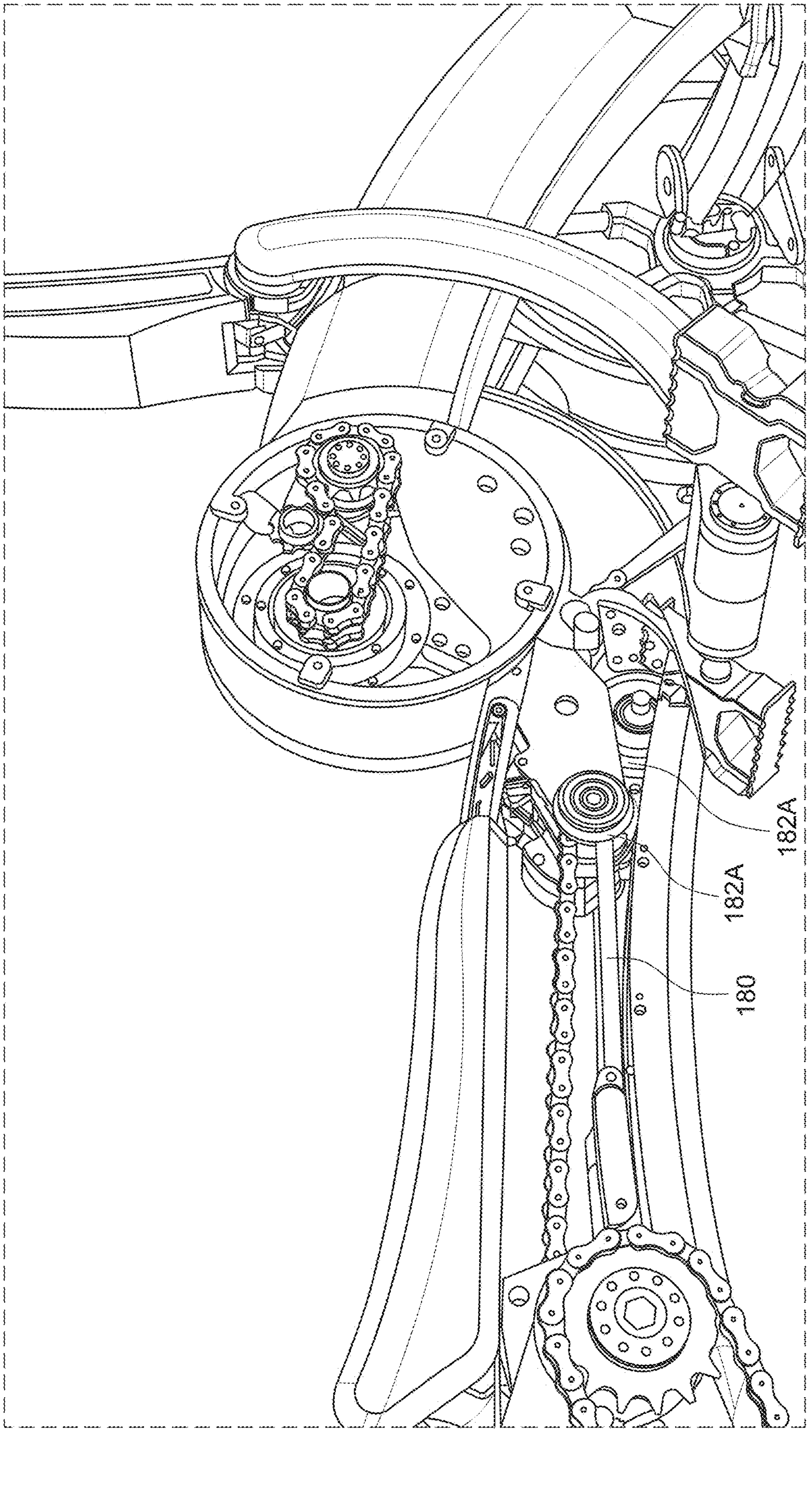
FIG. 6B is a somewhat schematic perspective view illustrating the motor box and center frame member of FIG. 6A in a partially assembled configuration.
Figure 6C:
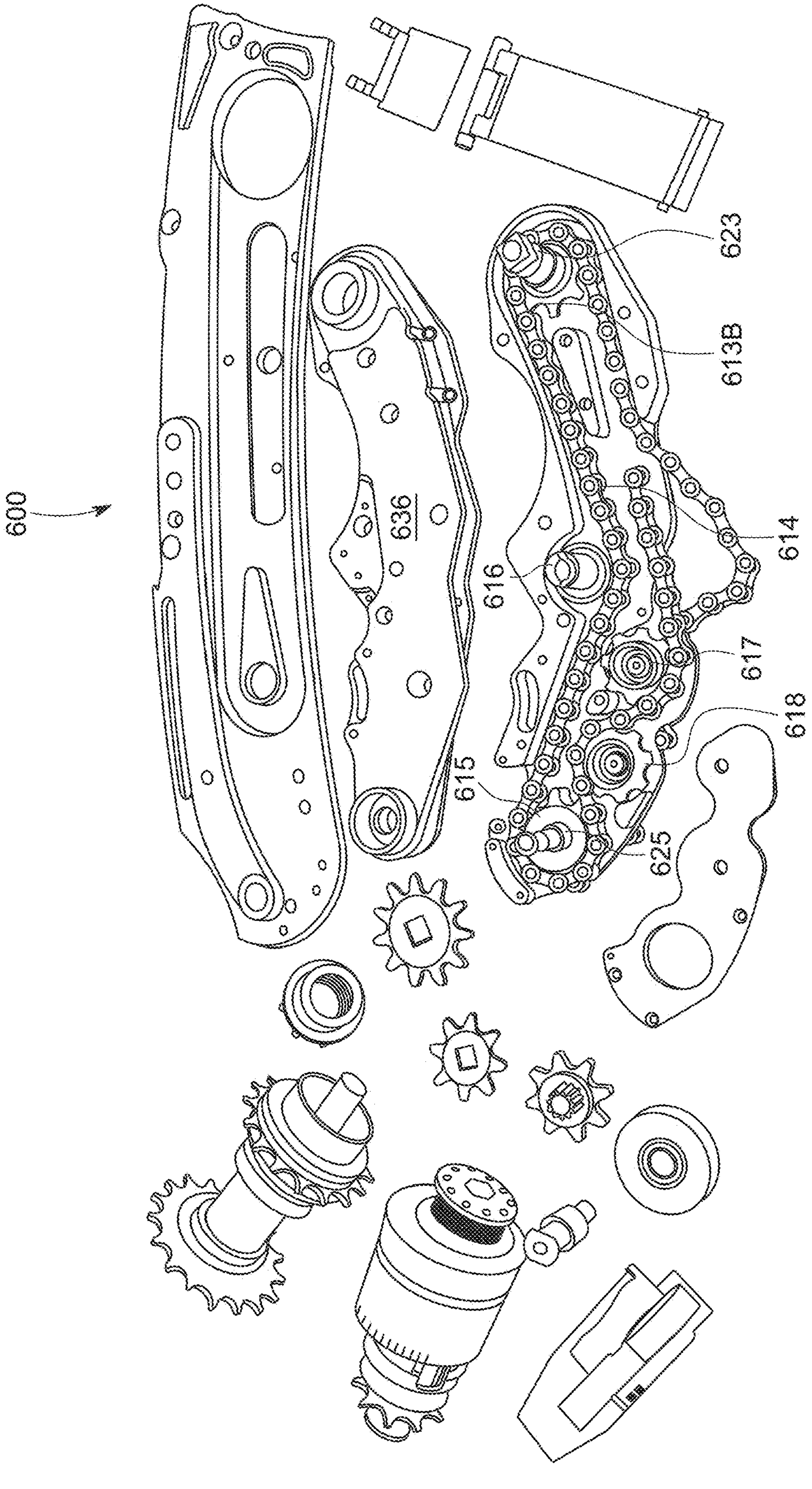
FIG. 6C is a somewhat schematic illustration of components of a drive transfer linkage for transferring power from the motor to the drive spindle according to additional features of the present inventive concepts.
Figure 6D:
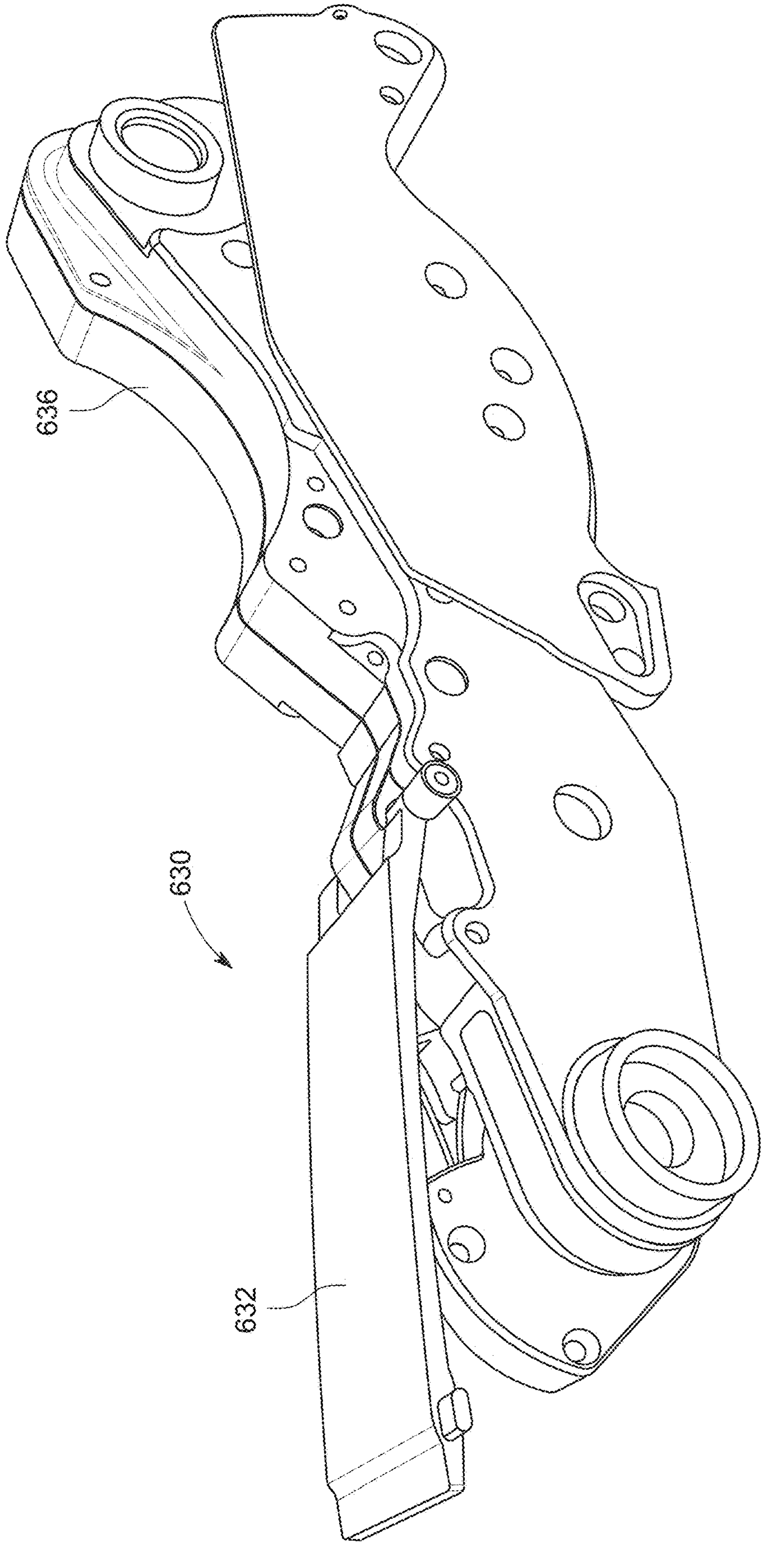
FIG. 6D is a somewhat schematic illustration of the four bar collapsible articulating linkage and latch of the hybrid vehicle of FIG. 1.
Figure 6E:
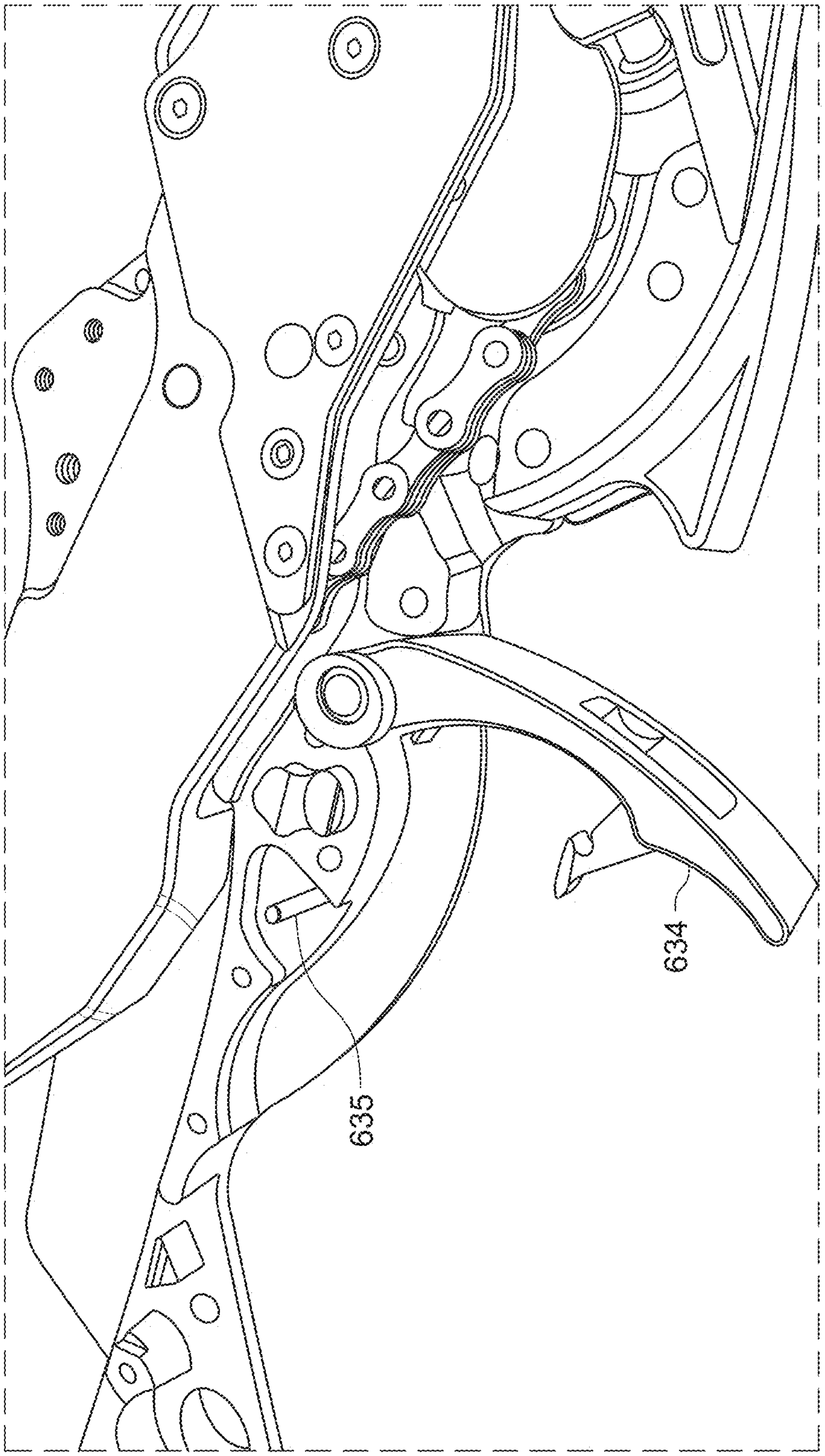
FIG. 6E is a somewhat schematic illustration providing another view of the four bar collapsible linkage in a partially collapsed configuration.
Figure 6F:
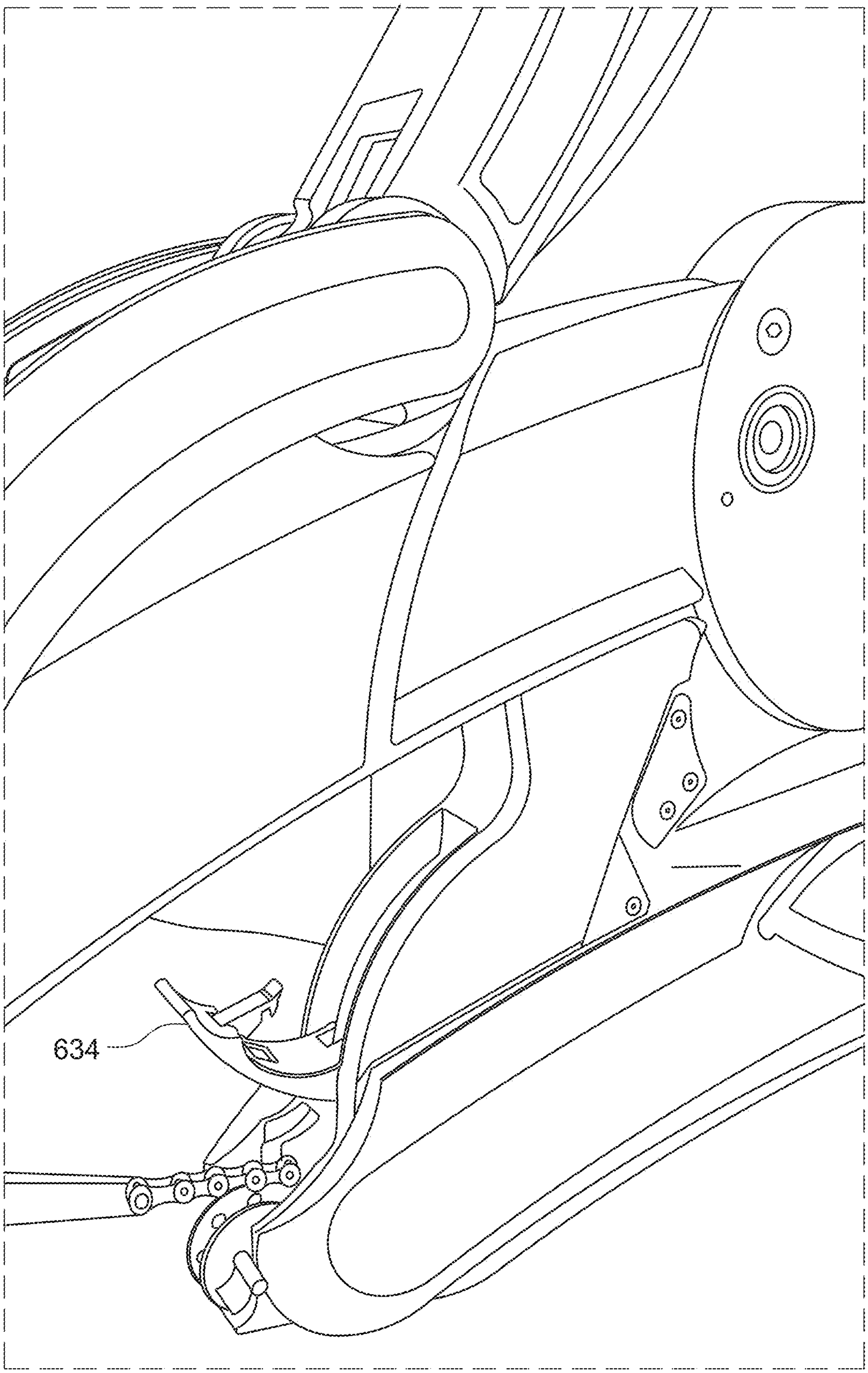
FIG. 6F is a somewhat schematic close-up view of the four bar linkage arranged in the hybrid vehicle of FIG. 1 with a latch of the linkage in a released position.
Figure 6G:
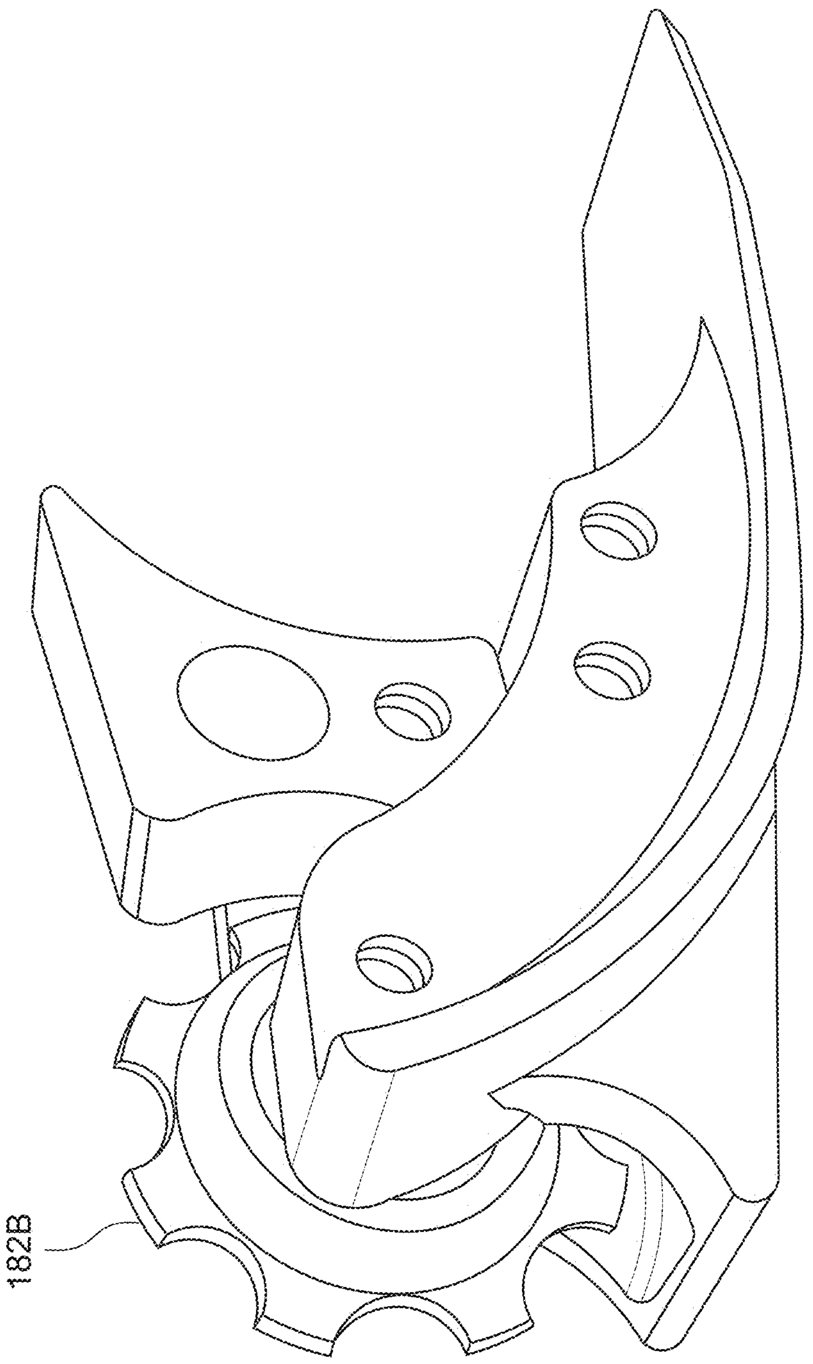
FIG. 6G is a somewhat schematic illustration of a chain entry guide for receiving the pump-action driving chain from the lower pump-action assembly.
Figure 7:
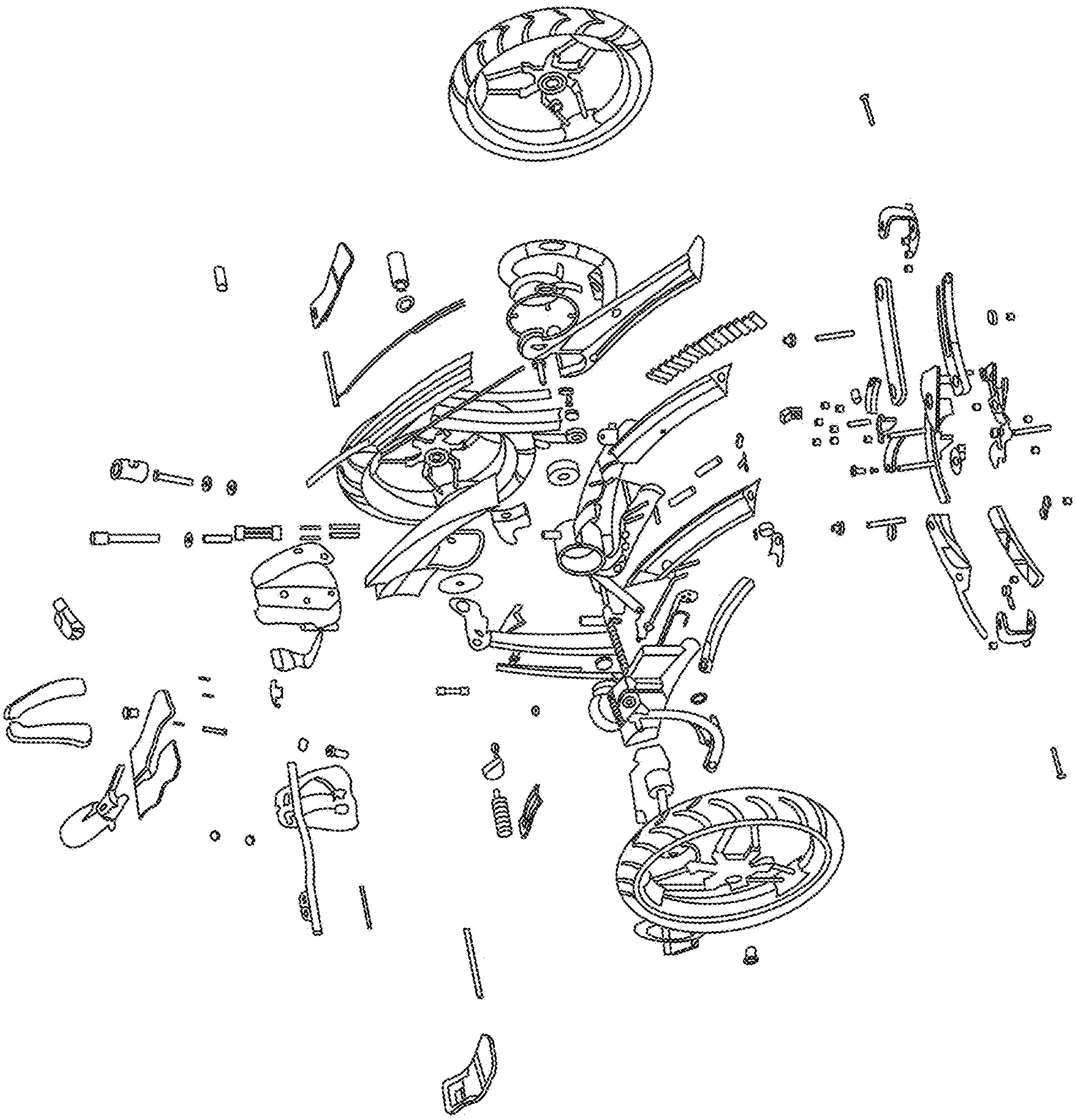
FIG. 7 is a somewhat schematic exploded perspective view of the hybrid vehicle of FIG. 1.

Referring additionally to FIGS. 6-6G, a motorized power box 600 including additional sprockets, pulleys, gears, chains, and/or belts can be provided. In the embodiment shown, the motor box 600 can be arranged along the front frame assembly 104 near the pump-arm 112 and steering assembly 120. The motorized power box 600 can be connected to the driving axle or spindle 170 through a series of chains and sprockets (or other similar mechanisms). In one embodiment, an articulating linkage 610 can be provided to enable further collapsibility of the vehicle while providing an available motor assist when the vehicle is in its operating configuration.

More specifically, a four-bar articulating linkage 610 can be provided to connect the power box 600 and front frame assembly 104 to the rear frame assembly 106 and drive spindle 170. During operation of the vehicle 100, the four bar linkage 610 is locked in an operating position with the motor 250 in the power box 600 available to provide assistance or all of the power needed to propel the vehicle 100. The motor 250 can, for instance, be connected to a one-directional drive wheel (or clutch) 400 mounted on the driving axle or driving spindle 170 through a series of chains 612, 614 and sprockets and guides 611, 613, 615, 617, 619 arranged along the four-bar linkage 610 and through or along a center frame member 108 of the rear frame assembly 106.

Specifically referring to FIGS. 6D-6F, a dual-latch system 630 can be provided to safely and securely lock the four-bar linkage 610 in its operating position. A first (pre-release) latch 632 acts as a pre-release mechanism to unlock the second latch 634. The second (primary) latch 634 releases the four-bar linkage 610 from its operating position and permits the rear frame assembly 106 to swing down and forward underneath the power box 600 and the front frame assembly 104. A cam mechanism 636 can be used to define the path of travel for collapsing the rear frame assembly 106 underneath the front frame assembly 104 and for returning the frame 102 to its extended operational position. In this manner, the length of the vehicle 100 can be substantially reduced to further facilitate easy storage.

In the embodiment shown, in addition to housing the motor 250 and the control board 252, the motor box 600 can include a chain and sprocket assembly 610 that arranges the components in their proper relationship with the four bar articulating linkage 610. More specifically, a first chain 612 can connect the sprocket 611 on the motor's drive shaft 251 to a first free spinning axle sprocket 613A on a first free spinning axle 623 arranged in the power box 600. A second chain 614 can connect a second sprocket 613B mounted on the first axle 623 to a third sprocket 615 mounted on a second free spinning axle 625 arranged in the center frame member 108. A third chain 616 arranged through the center frame member 108 can connect the third sprocket 615 to a second sprocket 404 on the one-directional driving wheel (or clutch) 400 arranged on the driving axle 172. A final chain 190 can connect an outside driving sprocket 174 of the driving spindle 170 to a sprocket 194 on the rear wheel axle 192 to drive the rear wheel 136. Additional sprockets, gears, pulleys, and/or guides, including, for example, a fourth 616, fifth 617, and sixth free spinning sprocket 618, can be provided along the linkage 610, along with additional sprockets, pulleys, gears, and/or guides in the power box 600 or center frame member 108 to provide alignment aids, directional and locational guides, to take up chain slack, to provide driving forces, and to simplify assembly.

Figure 4B:
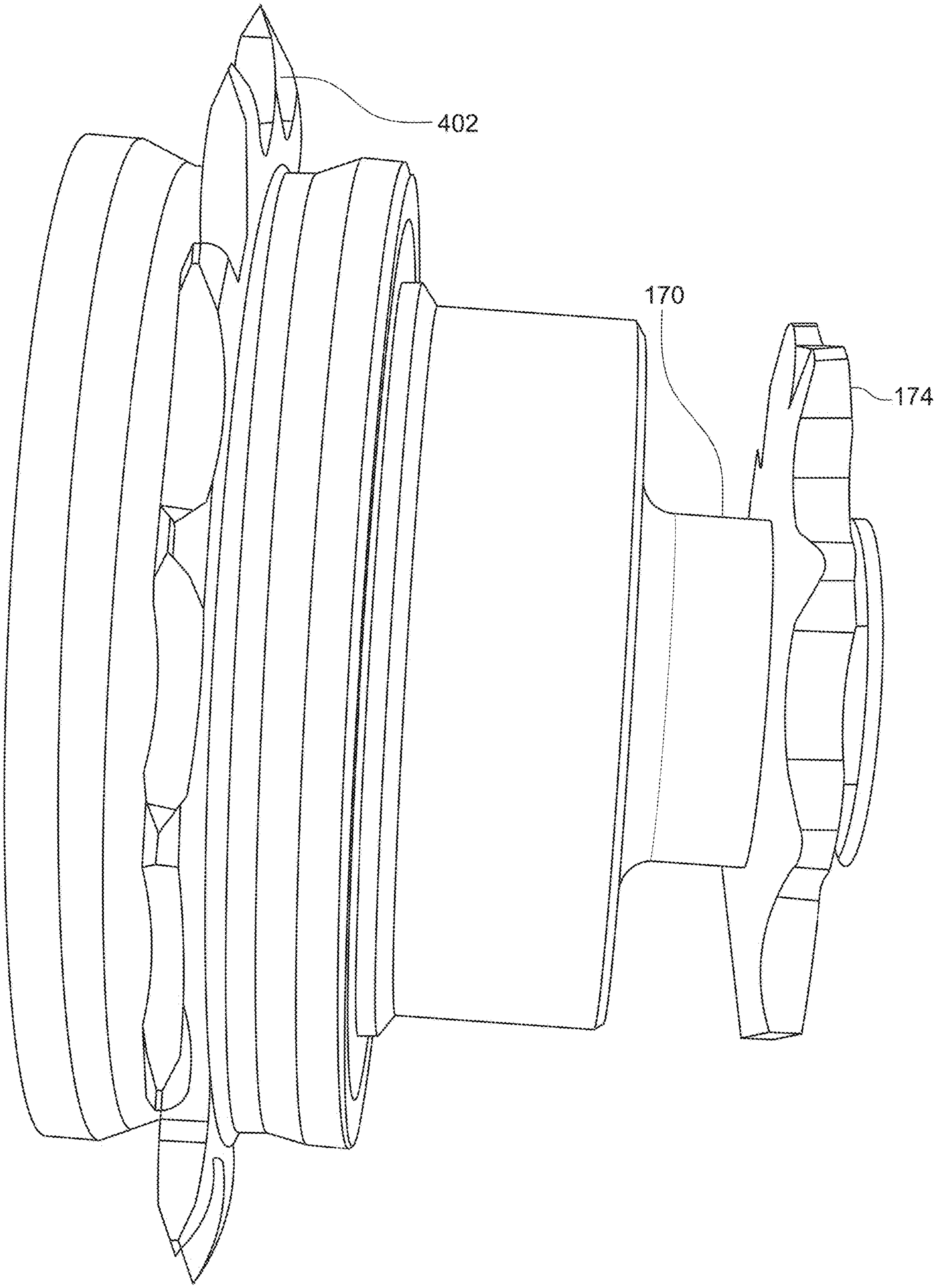
FIG. 4B is a somewhat schematic illustration of a one-way clutch mechanism for the drive clutch of FIG. 4A which enables the pump-action chain to drive the drive spindle in a forward direction while permitting free spin in the opposite direction.

In one embodiment, both the chain 150 connecting the lower pump-action assembly 140 to the drive spindle 170 and the chain 616 connecting the motor 250 to the drive spindle 170 are arranged through the center frame member 108 of the rear frame assembly 106. As further shown in FIGS. 4-4B, two one-directional drive wheels (or clutches) driven by the pump action assembly 110 and the motor 250 through first sprocket 402 and second sprocket 404, respectively, can be configured in a single clutch unit 400 that is part of the drive spindle 170 within the center frame member 108. The elastic biasing member 180 of the pump chain 150 can also be arranged within the center frame member 108.

Figure 2:
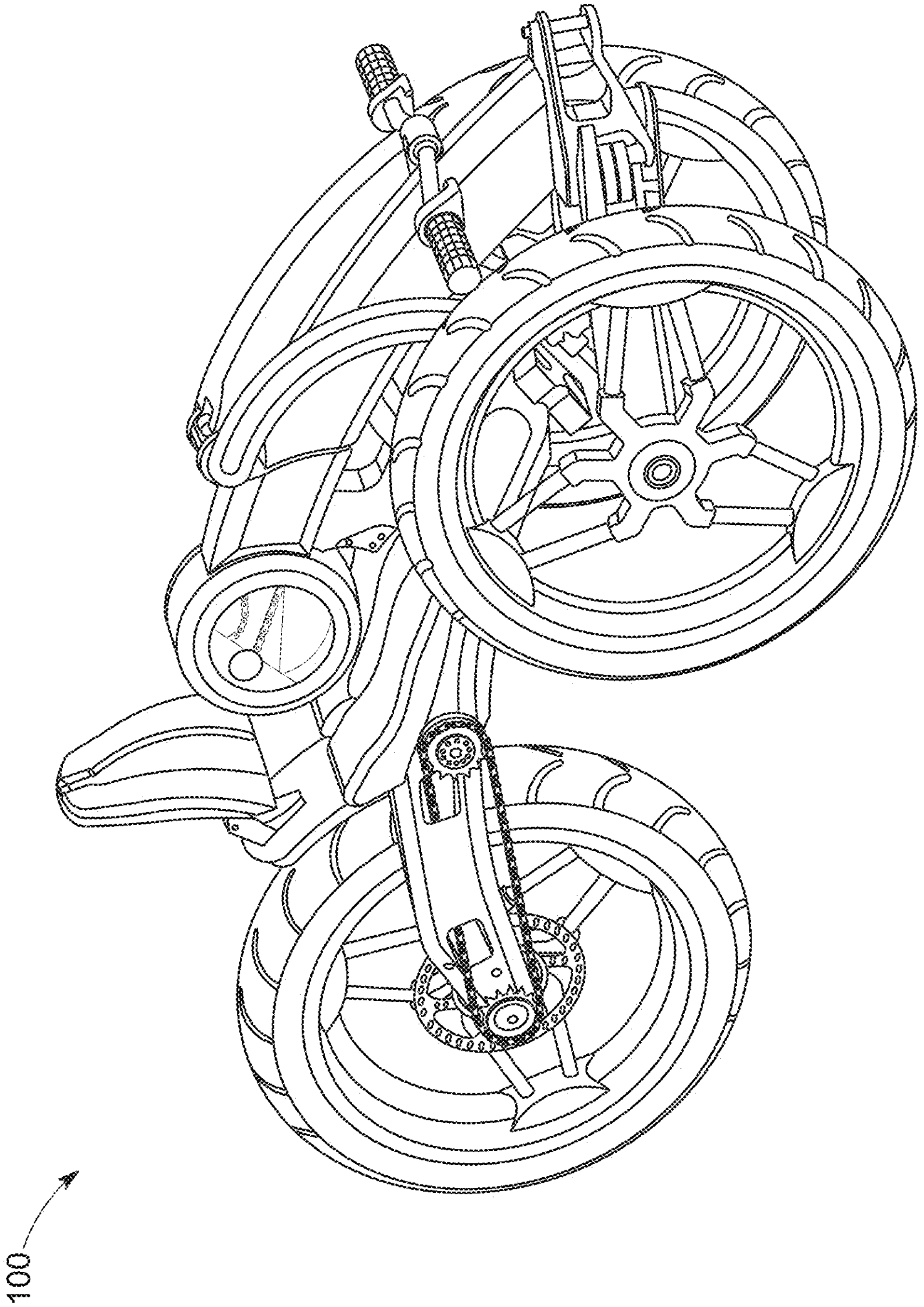
FIGS. 2-2A are somewhat schematic perspective views of the hybrid vehicle of FIG. 1 in a collapsed configuration according to additional principles of the present inventive concepts.
Figure 2A:
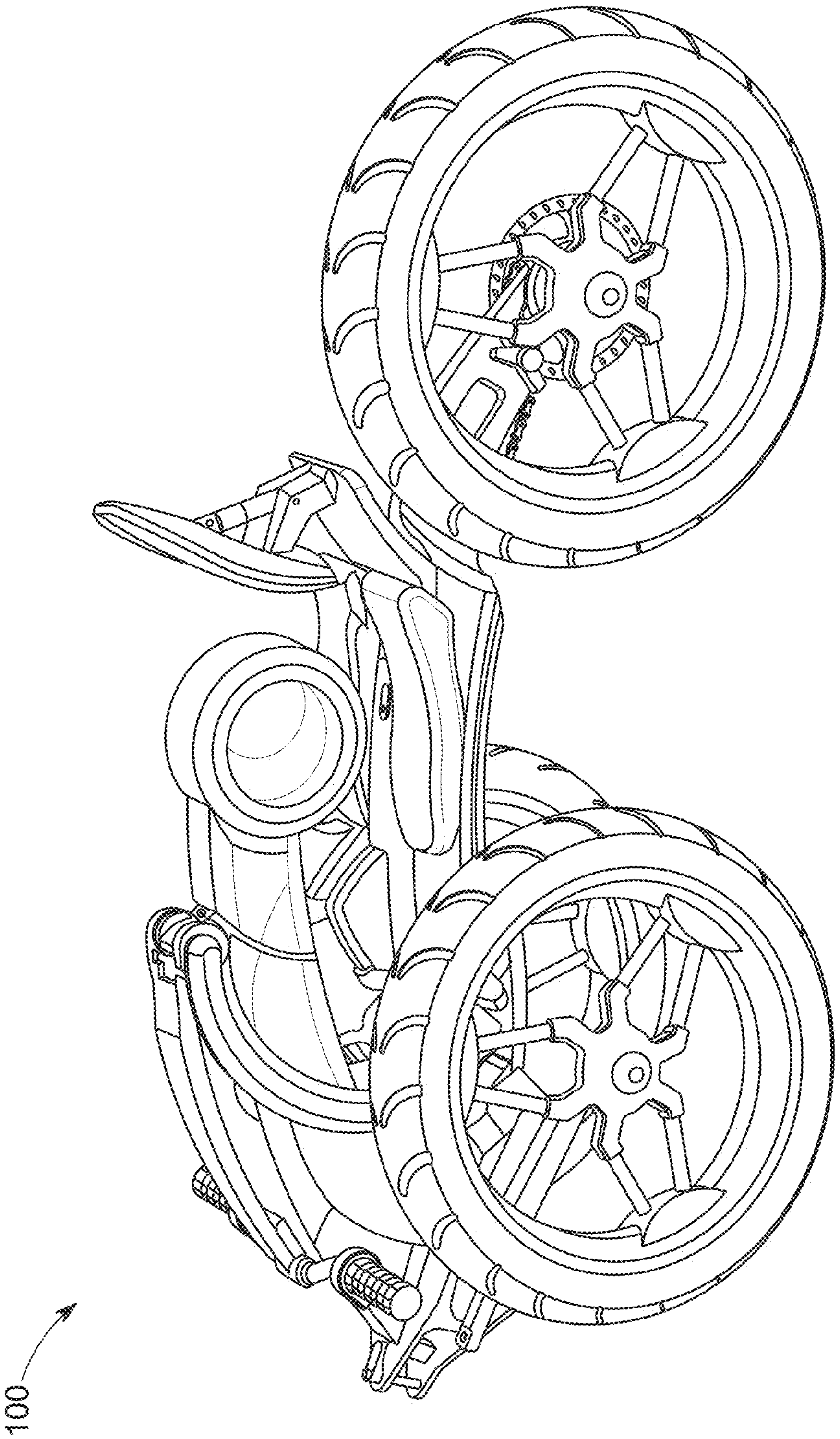
Figure 2B:
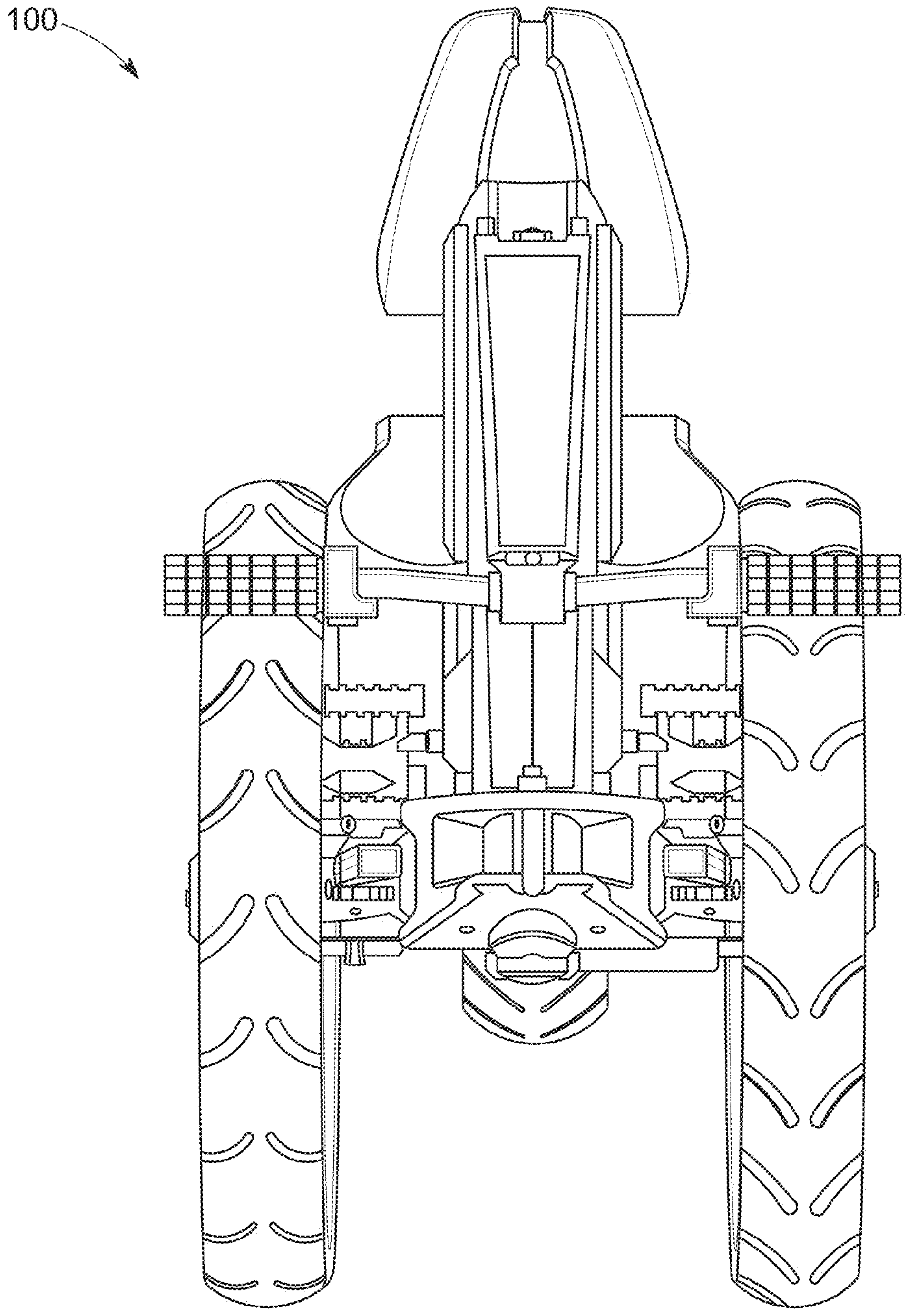
FIG. 2B is a somewhat schematic front view of the hybrid vehicle of FIG. 2.
Figure 2C:
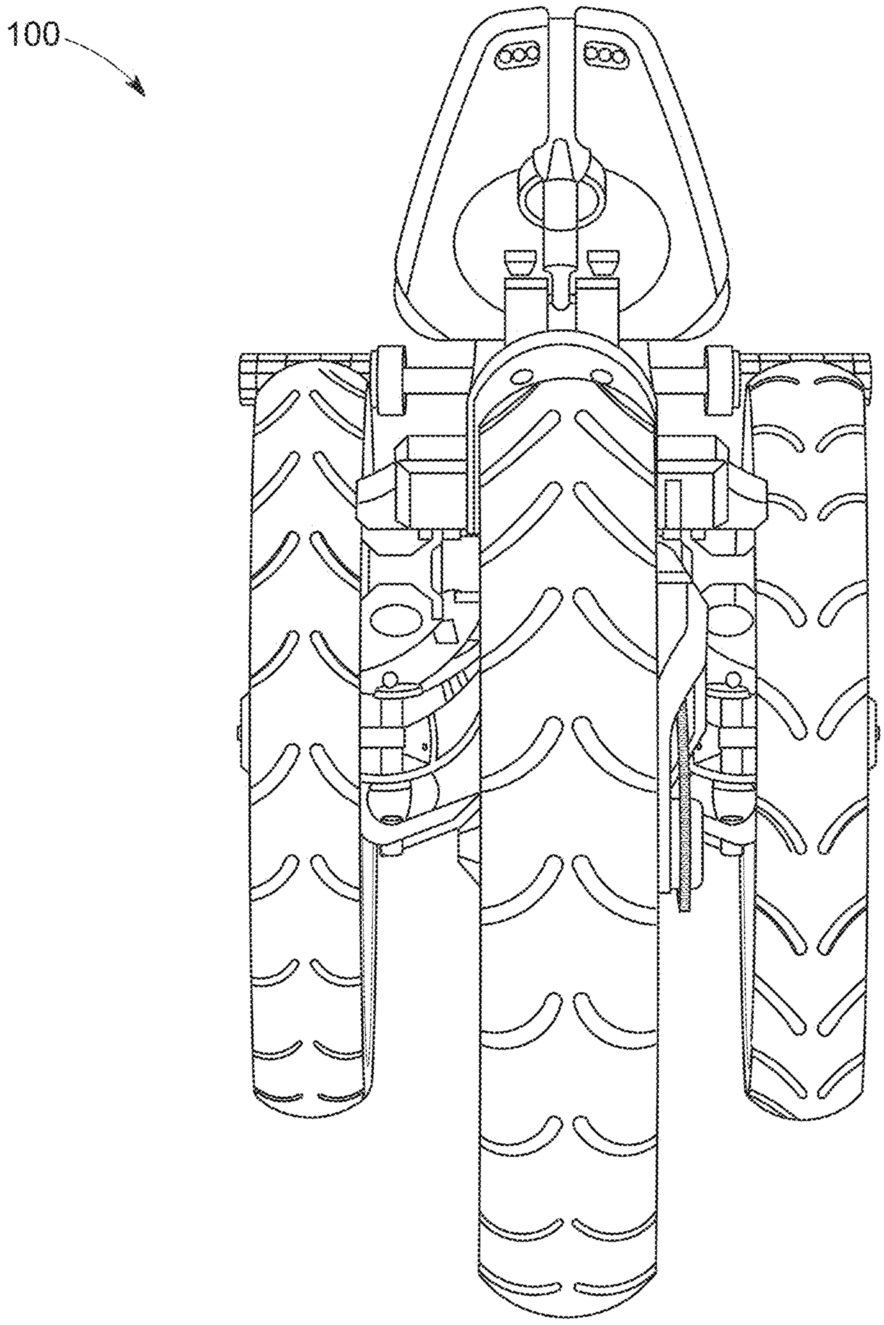
FIG. 2C is a somewhat schematic rear view of the hybrid vehicle of FIG. 2.
Figure 2D:
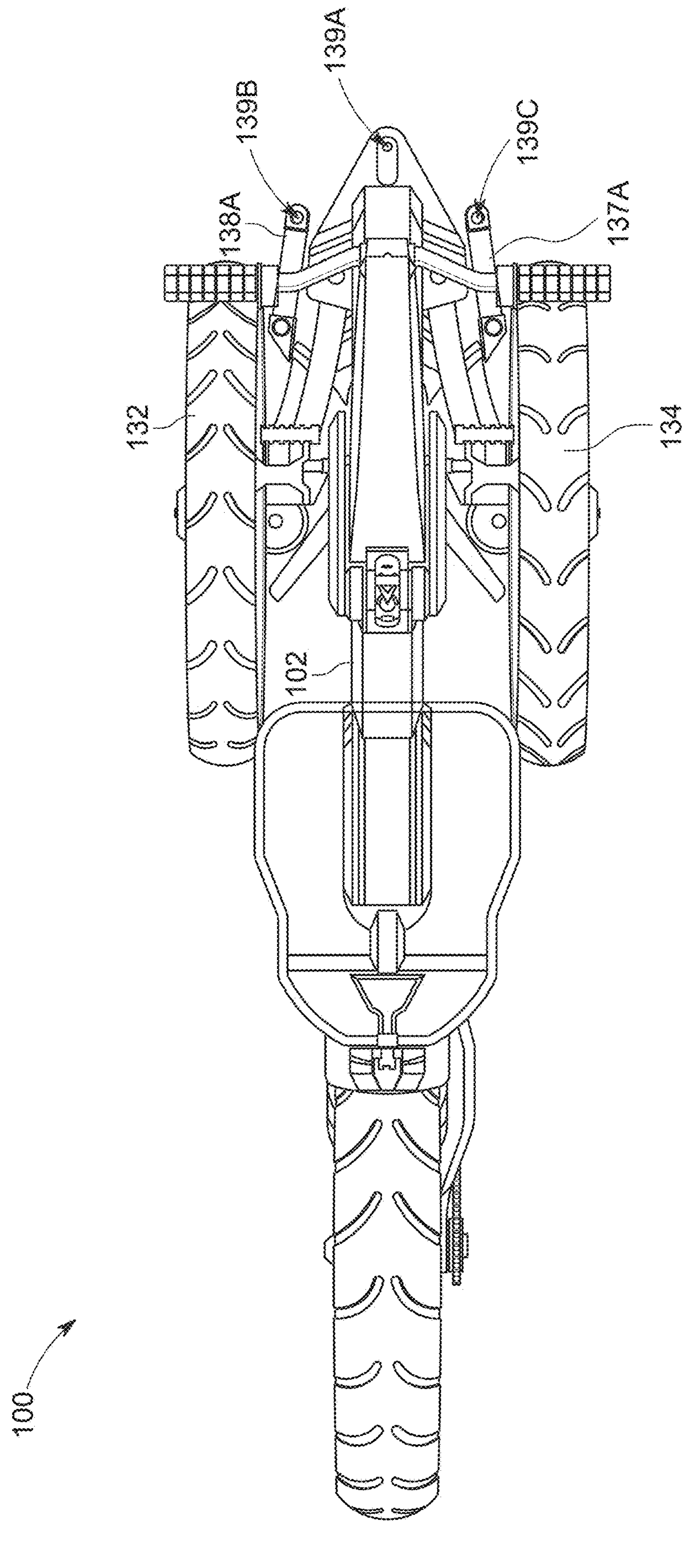
FIG. 2D is a somewhat schematic top view of the hybrid vehicle of FIG. 2.
Figure 2E:
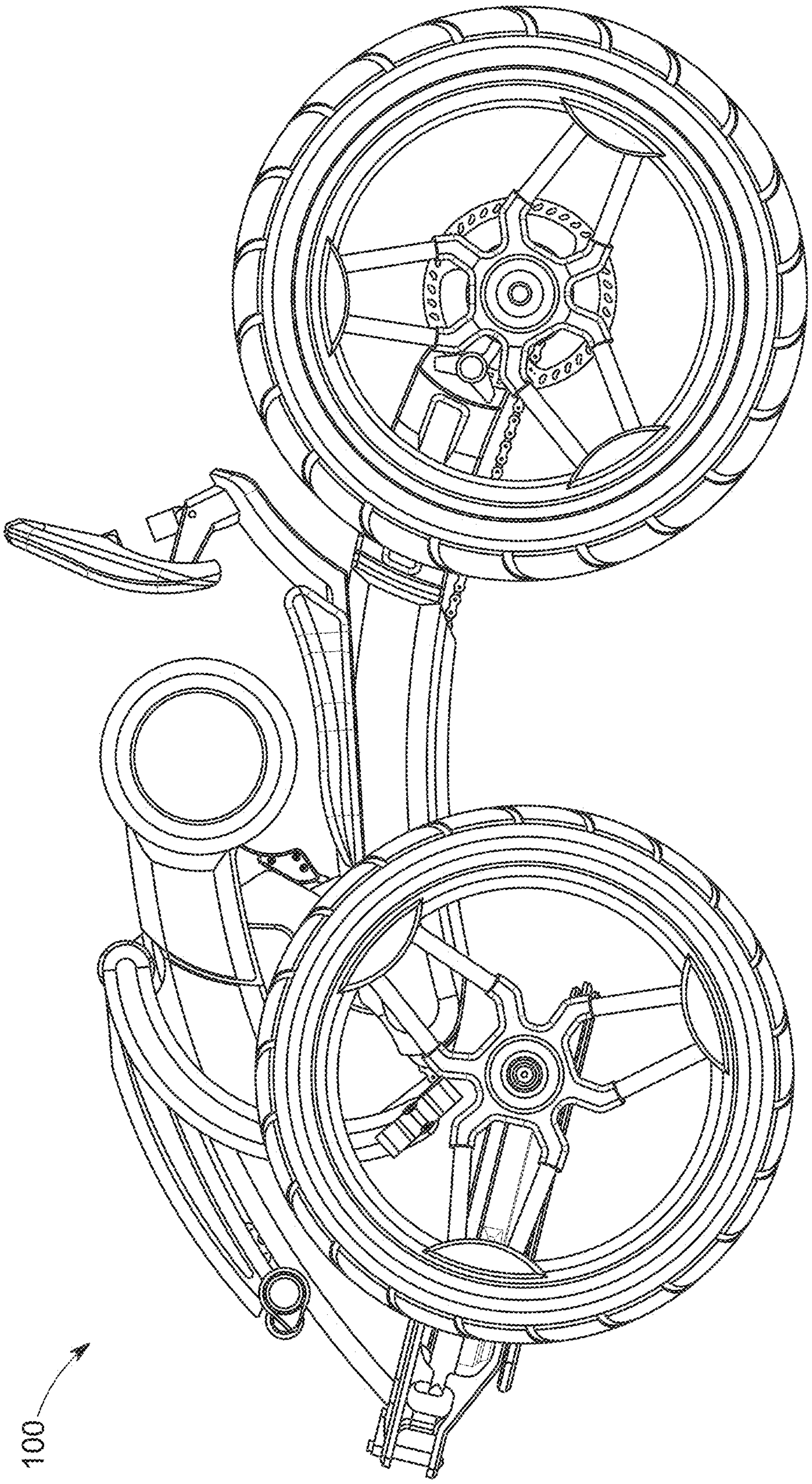
FIG. 2E is a somewhat schematic side view of the hybrid vehicle of FIG. 2.

Other features, such as a collapsible front wheel assembly 130, can provide further collapsibility that enables compact storage of the vehicle. As illustrated, for example, in FIGS. 1D, 1E, and 2D, the front wheels, 132, 134 for instance, can be mounted on swiveling swing arms 137, 138 that swing out to an extended position around pivot pins 137B, 138B for riding but swing into a collapsed position around the pivot pins 137B, 138B for storage. A locking pin 139 can be provided that slides into alignment holes 139A, 139B, 139C arranged in the front frame assembly 104 and the swing arm locking members 137A, 138A to lock the wheels 132, 134 in the extended riding position. With the pin 139 removed, the swing arms 137, 138 and wheels 132, 134 can be folded around the pivot points provided by pivot pins 137B, 138B into a collapsed position near the frame 102. Biasing springs 135 can also be provided (for instance between the swing arms 137, 138 or wheel mounts 132A, 134A and the frame 102) to apply a constant force to the wheel assembly 130 when extended to remove or reduce vibrations that would otherwise result from manufacturing tolerances between parts in the assembly 130.

The seat 300 can also include hinges or removable connection pins 320 to permit it to be folded or removed to further compact the vehicle for storage. In addition, the seat 300 can include a split seat design having a seat base 302 and two rider support halves 302A, 302B connected to the seat base 302 and arranged on opposite sides of the center frame member 108. The seat base 302 can be pivotably mounted to the center frame member 108. As more easily seen in FIG. 6, a rear suspension post 310 can be arranged on the frame 102 at the back of the seat base 302 with a suspension spring 312 arranged on the post 310 that supports the seat base 302. This can provide a spring biased seat position that can absorb some of the shock associated with vehicle travel and provide a smoother rider experience. The seat back 306 can be pivotably mounted to the seat base 302 with a spring biased piston assembly 308 to provide shock absorption to the seat back 306 as well.

In addition to the arm release squeeze lever 115A, a squeeze lever 115B arranged on the other handle 114B can connect via a brake cable 119B to a disc brake 320 arranged in communication with the driving wheel 136 to provide braking to the vehicle 100. When the braking lever 115B is squeezed, the disc brake activates to slow and stop the vehicle 100.

Various other designs and embodiments are also contemplated and numerous variations to the specific designs identified above are possible without departing from the spirit and scope of the inventive concepts. Having described and illustrated principles of the present inventive concepts on in various preferred embodiments thereof, it should be apparent that the invention can be modified in arrangement and detail without departing from such principles. In particular, as noted previously, chains and sprockets could be replaced by belts and pulleys without departing from the inventive principles herein. Accordingly, chains should be interpreted to cover belts and similar components and sprockets should be interpreted to cover pulleys and similar components.

What is claimed is:

1. A hybrid pump-action vehicle and therapy device comprising:

a collapsible frame;

a pump action assembly pivotably connected to the frame at a pivot point and configured to pivot rearward and forward around the pivot point to provide a pumping action, said pump action assembly having a pump arm and a lower pump action assembly;

a steering mechanism connected through the pump arm of the pump action assembly to a steering arm that is arranged to control a direction of travel of the vehicle;

a drive wheel, wherein the drive wheel is connected to a driving axle to drive forward movement of the vehicle in response to forward movement of the drive wheel;

a driving mechanism configured to drive the drive wheel in a forward direction in response to the pumping action of the pump action assembly;

a plurality of sprockets or pulleys and chains or belts that connect a motor drive shaft to the drive wheel such that the connection between the motor drive shaft and the drive wheel is maintained in both the operating position and the collapsed position; and a motor configured to selectively drive the drive wheel in a forward direction.

2. The hybrid vehicle according to claim 1, further comprising:

one or more sensors configured to sense an operating difficulty; and a circuit configured to receive information from the one or more sensors, to determine an amount of power assistance required from the motor, and to adjust the amount of power assistance from the motor to the drive wheel in response to the sensor input.

3. The hybrid vehicle according to claim 1, further comprising:

a motor assistance setting device that permits a user to select an amount of assistance desired from the motor ranging between no motor assistance to full motor assistance.

4. The hybrid vehicle according to claim 1, wherein the pump arm is releasably connectable to the lower pump action assembly such that it pivots with the lower pump action assembly when connected but pivots independently of the lower pump action assembly when released and wherein said steering mechanism is operable to steer the vehicle whether the pump arm is connected to the lower pump action assembly or released therefrom.

5. The hybrid vehicle according to claim 1, wherein the collapsible frame comprises a front frame assembly and a rear frame assembly connected together through a mechanical linkage that permits the front frame assembly and rear frame assembly to lock together in an operating position and that further permits the front frame assembly and rear frame assembly to unlock and articulate with respect to each other into a collapsed position that has a shorter overall length than the operating position.

6. The hybrid vehicle according to claim 5, further comprising a latch mechanism configured to lock the front and rear frame assemblies together into the operating position when latched and to permit the front and rear frame assemblies to articulate into the collapsed position when unlatched.

7. The hybrid vehicle according to claim 6, wherein the latch mechanism comprises a pre-release latch and a primary latch, and wherein the pre-release latch must be released before the primary latch can be released, and wherein the frame cannot be collapsed until the primary latch has been released.

8. The hybrid vehicle according to claim 5, wherein the mechanical linkage comprises a four-bar articulating linkage that connects the front frame assembly to the rear frame assembly and provides a cam mechanism for guiding movement between the front and rear frame assemblies.

9. The hybrid vehicle according to claim 5, further comprising a single rear wheel mounted on a rear axle to propel the vehicle forward in response to forward movement of the driving axle.

10. The hybrid vehicle according to claim 1, wherein the vehicle comprises a front wheel assembly having two wheels connected to the frame through a pair of swiveling swing arms, wherein during operation of the vehicle the connection between the frame and swing arms is locked to maintain the wheels in an extended operating position, and wherein the connection between the frame and swing arms can be released to permit the wheels to be collapsed inward toward the frame to reduce the overall width of the vehicle.

11. The hybrid vehicle according to claim 1, wherein the lower pump action assembly comprises foot pedals or foot plates for allowing an operator's legs to participate in the pumping action.

12. The hybrid vehicle according to claim 11, wherein the pump arm is releasably connectable to the lower pump action assembly to permit an operator's arms to selectively participate in the pumping action.

13. The hybrid vehicle according to claim 12, wherein the pump arm comprises a latch mechanism that rigidly connects the pump arm to the lower pump action assembly when latched and that permits rotational movement of the pump arm with respect to the lower pump action assembly when unlatched.

14. The hybrid vehicle according to claim 1, wherein the pump action assembly has a pump arm and a lower pump action assembly having one or more foot pedals or foot plates, wherein the pump arm is releasably connectable to the lower pump action assembly such that it pivots with the lower pump action assembly when connected but pivots independently of the lower pump action assembly when released.

15. A hybrid pump-action vehicle and therapy device comprising:

a collapsible frame;

a pump action assembly pivotably connected to the frame at a pivot point and configured to pivot rearward and forward around the pivot point to provide a pumping action, said pump action assembly having a pump arm and a lower pump action assembly;

a steering mechanism connected through the pump arm of the pump action assembly to a steering arm that is arranged to control a direction of travel of the vehicle;

a drive wheel, wherein the drive wheel is connected to a driving axle to drive forward movement of the vehicle in response to forward movement of the drive wheel;

a driving mechanism configured to drive the drive wheel in a forward direction in response to the pumping action of the pump action assembly; and a motor configured to selectively drive the drive wheel in a forward direction, wherein a one-directional driving clutch provides the drive wheel, said driving clutch having a first driving wheel sprocket or pulley connected to a first belt or chain driven by the pump arm and a second driving wheel sprocket or pulley connected to a second belt or chain driven by the motor, wherein forward driving movement of either the first or second driving wheel sprockets or pulleys drives forward movement of the driving axle, but wherein rearward movement or stationary positioning of the first and second driving wheel sprockets or pulleys does not affect movement of the driving axle.

16. A hybrid pump-action vehicle and therapy device comprising:

a frame;

a pump action assembly pivotably connected to the frame at a pivot point and configured to pivot rearward and forward around the pivot point to provide a pumping action, said pump action assembly having a pump arm and a lower pump action assembly having one or more foot pedals or foot plates, wherein the pump arm is releasably connectable to the lower pump action assembly such that it pivots with the lower pump action assembly when connected but pivots independently of the lower pump action assembly when released;

a steering mechanism connected through the pump arm of the pump action assembly to a steering arm that is arranged to control a direction of travel of the vehicle, wherein said steering mechanism is operable to steer the vehicle whether the pump arm is connected to the lower pump action assembly or released therefrom;

a plurality of drive wheels connected to a driving axle to drive forward movement of the vehicle in response to forward movement of any of the drive wheels;

a driving mechanism configured to drive one of the drive wheels in a forward direction in response to the pumping action of the pump action assembly, and wherein operation of the pump arm does not contribute to the pumping action when its connection to the lower pump action assembly is released; and a motor configured to selectively drive one of the drive wheels in a forward direction.

17. The hybrid vehicle according to claim 16, further comprising:

one or more sensors configured to sense an operating difficulty; and a circuit configured to receive information from the one or more sensors and determine an amount of power assistance required from the motor and to increase or decrease the amount of power assistance from the motor to the drive wheel in response to the sensor input.

18. The hybrid vehicle according to claim 16, further comprising:

a motor assistance setting device that permits a user to select an amount of assistance desired from the motor ranging from no assistance to full motor assistance.

19. The hybrid vehicle according to claim 16, further comprising:

a collapsible frame comprising a front frame assembly and a rear frame assembly connected together through a mechanical linkage that permits the front frame assembly and rear frame assembly to lock together in an operating position and that further permits the front frame assembly and rear frame assembly to unlock and articulate with respect to each other into a collapsed position that has a shorter overall length than the operating position.

20. The hybrid vehicle according to claim 19, further comprising:

a latch mechanism configured to lock the forward and rear frame assemblies together into the operating position when latched and to permit the forward and rear frame assemblies to articulate into the collapsed position when unlatched, wherein the latch mechanism comprises a pre-release latch and a primary latch, and wherein the pre-release latch must be released before the primary latch can be released, and wherein the frame cannot be collapsed until the primary latch has been released.

* * * * *